United States Patent
Nicholls et al.

(10) Patent No.: US 12,239,092 B2
(45) Date of Patent: Mar. 4, 2025

(54) WASTE RECEPTACLE

(71) Applicant: Hebe Studio Ltd., Wardington (GB)

(72) Inventors: Simon Nicholls, Daventry (GB); James Tuthill, Oxford (GB); Johannes Paul, London (GB); William Windham, Banbury (GB)

(73) Assignee: HEBE STUDIO LTD, Wardington (GB)

( * ) Notice: Subject to any disclaimer, the term of this patent is extended or adjusted under 35 U.S.C. 154(b) by 231 days.

(21) Appl. No.: 17/756,680

(22) PCT Filed: Nov. 27, 2020

(86) PCT No.: PCT/EP2020/083656
§ 371 (c)(1),
(2) Date: May 31, 2022

(87) PCT Pub. No.: WO2021/110554
PCT Pub. Date: Jun. 10, 2021

(65) Prior Publication Data
US 2023/0000051 A1    Jan. 5, 2023

(30) Foreign Application Priority Data
Dec. 2, 2019  (GB) ...................................... 1917551

(51) Int. Cl.
*A01K 1/01* (2006.01)
(52) U.S. Cl.
CPC .................................. *A01K 1/0107* (2013.01)
(58) Field of Classification Search
CPC .. A01K 1/0107; A01K 1/0125; A01K 1/0114; A01K 1/033; A01K 1/034; B65D 2251/1083; B65D 2251/0021
(Continued)

(56) References Cited

U.S. PATENT DOCUMENTS 5,410,987 A * 5/1995 Simmons ............. A01K 1/0114
119/165
6,662,748 B1 * 12/2003 Hanks .................. A01K 1/0107
119/170
(Continued)

FOREIGN PATENT DOCUMENTS

CH           694574 A5 * 4/2005 ............. A01K 1/031
CN       204104470 U  * 1/2015
(Continued)

OTHER PUBLICATIONS

Modkat XL Litter Box "https://modkat.com/products/modkat-xl-litter-box", Mar. 2018 (Year: 2018).*
(Continued)

*Primary Examiner* — Morgan T Jordan
*Assistant Examiner* — Shada Mohamed Alghailani
(74) *Attorney, Agent, or Firm* — Taft Stettinius & Hollister LLP; Stephen F. Rost

(57) ABSTRACT

A waste receptacle (4) for animal excreta, the waste receptacle comprising: a base and at least one sidewall upstanding from the base, the base and at least one sidewall cooperating to define a housing having an internal void, a periphery of said at least one sidewall remote from said base defining an opening to said void; a platform support (41) coupled to said at least one sidewall in the vicinity of said sidewall periphery; and a platform (11) supportable by said platform support to partly obstruct said opening, said platform comprising first (13) and second (15) platform parts that are pivotally coupled to one another, neighbouring peripheral walls of said first and second platform parts each comprising a recess (202, 204), the recess in the peripheral wall of said first platform part cooperating with the recess in the peripheral wall of said second platform part to define an access port (5) for enabling an animal to access the internal void of the housing via said access port, said neighbouring walls of said (Continued)

first and second platform parts being spaced from one another to provide a lateral gap (206) between said first and second platform parts, the arrangement being such that litter on said platform can fall into the void through the gap or the port when one said platform part is pivoted relative to the other.

16 Claims, 18 Drawing Sheets

(58) Field of Classification Search
USPC .... 220/810, 256.1, 259.1, 254.3, 254.1, 826
See application file for complete search history.

(56) References Cited

U.S. PATENT DOCUMENTS

| | | | |
|---|---|---|---|
| 6,926,137 B2* | 8/2005 | Rudnick | B65D 43/26 |
| | | | 206/349 |
| 9,713,315 B2* | 7/2017 | Sweetman | A01K 1/0107 |
| D870,988 S | 12/2019 | Temper et al. | |
| 10,624,309 B2* | 4/2020 | Remick | A01K 1/0114 |
| 2005/0263089 A1* | 12/2005 | Hirokawa | A01K 1/0107 |
| | | | 119/165 |
| 2011/0000919 A1* | 1/2011 | Whalen | B65D 43/0212 |
| | | | 220/826 |
| 2013/0334241 A1* | 12/2013 | Abdi | B65D 43/0212 |
| | | | 220/837 |

FOREIGN PATENT DOCUMENTS

| | | |
|---|---|---|
| CN | 207820806 U | 9/2018 |
| CN | 209897924 U | 1/2020 |
| KR | 200298495 Y1 * | 12/2002 |
| TW | M598042 U | 7/2020 |

OTHER PUBLICATIONS

International Searching Authority; European Patent Office (EPO); International Search Report; Date of Mailing: Mar. 5, 2021; pp. 1-4.
International Searching Authority; European Patent Office (EPO); Written Opinion of the International Searching Authority; Date of Mailing: Mar. 5, 2021; pp. 1-5.

* cited by examiner

WASTE RECEPTACLE

This application is a U.S. national stage application under 35 U.S.C. § 371 of PCT International Application Serial No. PCT/EP2020/083656, which has an international filing date of Nov. 27, 2020, designates the United States of America, and claims the benefit of GB Application No. 1917551.2, which was filed on Dec. 2, 2019, the disclosures of which are hereby expressly incorporated by reference in their entirety.

FIELD

This disclosure pertains to a waste receptacle, particularly but not exclusively to a waste receptacle for domesticated animal waste, for example for waste from domestic cats. The following disclosure refers in detail to the management of waste from domestic felines, but it will be appreciated and should be borne in mind that this is merely one illustrative application of the teachings disclosed herein.

BACKGROUND

Domestic cats tend to be categorised as being "indoor" or "outdoor" cats. Outdoor cats, as the name suggests, are typically able to go outdoors and are usually encouraged to defecate and urinate outside. Indoor cats, on the other hand, tend to spend most if not all of their time indoors and as a consequence usually urinate and defecate inside.

To manage the waste from such cats it has previously been proposed to provide a relatively shallow "litter tray" which comprises a—typically plastics—base with raised sidewalls in which an amount of absorbent litter is provided. An illustrative example of such a tray is the "42 cm Cat Litter Tray" sold by Whitefurze Limited, Burnsall Road, Canley, Coventry CV5 6BT, United Kingdom (see: http://www.whitefurze.net/42-cm-cat-litter-tray.html). The litter is intended to soak up liquid waste from the animal and is typically formulated to clump together so that used litter and any solid waste can readily be lifted from the tray for disposal. Typically, a slotted waste scoop is utilised for this purpose, the slots in the scoop allowing any unused litter to fall back into the tray.

Whilst such trays function adequately, as a cat's natural instinct is to rake through the litter after use to cover their waste, litter can often be ejected from the relatively shallow tray. Another issue is that once the scoop has been utilised to lift waste out of the tray, there is nowhere provided for storage of the—now soiled—scoop. It is also the case that as many cats prefer to defecate and urinate in quiet and secluded locations, an open-sided litter tray may make such animals feel uncomfortable. Another issue associated with such trays is that the base, as it is repeatedly scratched by the cat following defecation and urination, can become scratched and scored, whereupon it can be difficult to properly clean the tray.

From the animal owner's perspective, it is also the case that litter trays of this type can often be something of an eyesore, and to that end it would be preferable if a more aesthetically pleasing arrangement could be provided.

To address at least some of these issues it has previously been proposed to provide a "litter box". Such boxes tend to have much higher sides than a litter tray, which helps contain litter in the box and also to provide a more secluded environment for the animal. Typically, the box will be provided with an access port, for example in one of the aforementioned sidewalls. Such boxes may also be provided with a lid and the access port may be provided in that lid. Alternatively, a lid may be omitted and the access port defined by the upstanding sidewalls of the box.

Illustrative examples of such litter boxes are the so called "Flip Litter Box" and the "Modkat Litter Box" all of which are manufactured by ModProducts, LLC and can be viewed at http://modkat.eu. These boxes provide a more secluded space for the animal, and are significantly more aesthetically pleasing than a traditional litter tray.

To enhance cleanliness ModProducts LLC sell liners for the boxes listed above. These liners are sized to fit within the box and are supported by the sidewalls of the box to define a void in which litter is placed for the animal to use. In some instances the liners are held in place by connecting them to hooks that clip over the sidewalls of the box. In other instances the liners are held in place by a tension band (for example, a length of sprung steel) integrated into the liner.

The ModProducts boxes are more aesthetically pleasing than earlier offerings, and the liners do enhance cleanliness, but the issues associated with the scoop still remain. In the context of the ModProducts boxes, one of the sidewalls of the boxes is configured so that the handle of the scoop can be engaged with the sidewall so that the scoop hangs from the top of the sidewall, outside of the box. Whilst this is more convenient than having the scoop lying on the floor next to the box or stored elsewhere, the scoop is still on-show and accessible—which could be problematic if there are young children around, as it would not be desirable for those children to handle a soiled scoop.

Another issue with the ModProduct boxes, in particular with the liners for these boxes, is that if the liner should be lifted out of the box (as users tend to do when preparing to empty the liner of waste) then the liner loses its' generally open cuboid form and the unused litter and solid waste tend to pool in the bottom of the liner. This can make it hard for the user to extract clumped litter and solid waste from the liner with the scoop.

A further issue with liners that are self-supporting, for example by means of a tension band integrated into an upper region of the liner sidewalls, is that the liner is typically only restrained with its' sidewalls upstanding by virtue of a frictional force between the liner and the receptacle. As a consequence, when a cat jumps into the box the liner can become dislodged whereupon the liner sidewalls can collapse into the box and waste can escape from the liner and pass into the space between the liner and the box. Similar issues can affect the shelves that are typically placed over the void to provide an animal with somewhere to perch before it moves into the void.

Another issue that particularly affects so-called "top entry" litter boxes is that a cat, for example, using the box can sometimes carry litter from within the box onto the platform that has the access port formed in it. Once on the platform the litter, which may have come into contact with animal waste, can travel outside of the box or could come into contact with a user. To address such issues, Modproducts have introduced a larger litter box known as the "Modcat XL litter box". This box has a two-part platform which can be manipulated so that litter tends to fall back inside the box. Specifically, the platform is in two parts that are pivotally coupled to one another. In addition, one of the two parts (the one in which the access port is formed) is pivotally coupled to the walls of the box. This means that the platform can be manipulated between a first position where the platform is flat and parallel to the base of the box, a second position where one part of the platform (the part without the access port) has been pivoted with respect to the other to lie on top of the other, and a third position in which the folded platform parts can be pivoted relative to the walls of the box.

A problem with this arrangement is that in order to move between the second and third positions it is necessary for the user to slide the folded platform to move the second part of the platform clear of a ledge on which it sits before the folded platform can be pivoted relative to the walls of the box. This arrangement is somewhat counterintuitive and requires a large amount of handling of the platform of the box, which may of course have been soiled by the animal climbing in and out of the box. It is also possible for litter on top of the platform to become trapped between the folded parts of the platform, whereupon that litter may not fall back into the box when the folded platform is pivoted.

Aspects of the waste receptacle disclosed herein have been devised with some or all of the above in mind.

SUMMARY

In accordance with a presently preferred embodiment of the teachings disclosed herein, there is provided a waste receptacle for animal excreta, the waste receptacle comprising: a base and at least one sidewall upstanding from the base, the base and at least one sidewall co-operating to define a housing having an internal void, a periphery of said at least one sidewall remote from said base defining an opening to said void; a platform support coupled to said at least one sidewall in the vicinity of said sidewall periphery; and a platform supportable by said platform support to partly obstruct said opening, said platform comprising first and second platform parts that are pivotally coupled to one another, neighbouring peripheral walls of said first and second platform parts each comprising a recess, the recess in the peripheral wall of said first platform part cooperating with the recess in the peripheral wall of said second platform part to define an access port for enabling an animal to access the internal void of the housing via said access port, said neighbouring walls of said first and second platform parts being spaced from one another to form a lateral gap, the arrangement being such that litter on said platform can fall into the void through the gap or the port when one said platform part is pivoted relative to the other.

An advantage of this arrangement is that operation of the waste receptacle is extremely intuitive, and any litter left on the platform is highly likely to fall into the void when one platform part is pivoted relative to the other—either via the gap between the platform parts or via the access port itself.

The waste receptacle may further comprise a liner insertable into said internal housing void, the housing liner having a liner base and at least one liner sidewall supportable in use so as to be generally upstanding from said liner base, the liner base and said at least one liner sidewall cooperating to define an internal liner void for the receipt of animal litter.

The liner base may include a housing for a liner base reinforcing member; said liner base reinforcing member being operable, when received in said liner base reinforcing member housing, to maintain said liner base in a generally planar configuration. The base reinforcing member housing may comprise a pocket, said pocket being open at at least one end for the receipt of said base reinforcing member. The base reinforcing member may comprise a generally planar body, for example a tray.

In one implementation the platform support is operable to support at least a portion of said liner so as to assist with the maintenance of said at least one liner sidewall in a generally upright configuration when the liner is installed in said receptacle. The at least one liner sidewall may supportable in use by means of a resiliently deformable member coupled to a portion of said liner sidewall distal from said liner base. The platform support preferably co-operates with said resiliently deformable member to support said liner sidewall. The platform support may include a groove configured to receive said resiliently deformable member.

In one arrangement the at least one liner sidewall is supportable in use by means of support elements coupled to said platform support, said support elements being configured to cooperate with complementary elements coupled to said liner sidewall.

Preferably the platform is detachably supportable by said platform support. The receptacle may further comprise a platform retainer and a receiver for a platform retainer, wherein said platform retainer is coupled to one of said platform and said housing sidewall and the receiver for a platform retainer is coupled to the other of said platform and said housing side wall, said receiver being co-operable with said platform retainer to keep at least a portion of said platform in abutment with said platform support.

Preferably, said lateral gap extends from one longitudinal edge of said platform through said access port to an opposite longitudinal edge of said platform.

The platform support may comprise a plurality of platform supports. For example, the platform support may comprise a first platform support coupled to said housing to support a first longitudinal side of said platform and a second platform support coupled to said housing to support a second longitudinal side of said platform opposite said first longitudinal side. In another arrangement, the platform support may comprise a U-shaped first platform support coupled to said housing to support a first end of said platform, and a second substantially planar platform support coupled to said housing to support a second end of said platform.

In another arrangement there is provided a waste receptacle for animal excreta, the waste receptacle comprising: a housing having a base and at least one sidewall upstanding from the base so as to define an internal housing void in which a liner can be provided; and a liner insertable into said internal housing void, the housing liner having a liner base and at least one liner sidewall supportable in use so as to be generally upstanding from said liner base, the liner base and said at least one liner sidewall cooperating to define an internal liner void for the receipt of animal litter; wherein the housing and the liner each comprise access ports that cooperate with one another when the liner is received within said internal housing void to allow an animal to enter the housing and access litter provided within said liner void, the at least one liner sidewall further comprising a pocket for the storage of a litter scoop, said pocket being provided on an external face of the at least one liner sidewall that is adjacent an internal face of said at least one housing sidewall when the liner is inserted into said internal housing void.

In one implementation said pocket is accessible by moving at least part of said liner sidewall away from said housing sidewall. Preferably a litter scoop stored in said pocket is normally at least partly hidden from sight between the liner sidewall and the housing sidewall, the litter scoop being revealed when at least part of said liner sidewall in the vicinity of said pocket is pulled away from said housing sidewall.

It is envisaged that the liner base may include a housing for a base reinforcing member; said base reinforcing member being operable, when received in said base reinforcing member housing, to maintain said liner base in a generally planar configuration. The base reinforcing member housing may comprise a pocket, said pocket being open at at least one end for the receipt of said base reinforcing member. The base reinforcing member may comprise a generally planar body, for example a tray.

In an envisaged arrangement, the at least one liner sidewall may comprise a front liner wall having said access port provided therein, said liner front wall may further comprise a housing for a front wall reinforcing member, said front wall reinforcing member being operable, when received in said front wall reinforcing member housing, to support the front wall of said liner. The front wall reinforcing member housing comprises a pocket opening towards said liner base. Preferably said front wall reinforcing member is configured to support a portion of said access port proximate said liner base. The front wall reinforcing member may be capable of interlocking with said base reinforcing member.

In one implementation, the receptacle access port maybe provided in a platform that is detachably supportable by a platform support coupled to said housing sidewall.

The platform support is preferably operable to support a portion of said liner so as to assist with the maintenance of said at least one liner sidewall in a generally upright configuration when the liner is installed in said receptacle.

The waste receptacle may further comprise a platform retainer coupled to said receptacle sidewall, the platform comprising a receiver for a platform retainer co-operable with said platform retainer to keep at least a portion of said platform in abutment with said platform support.

In one envisaged implementation, said at least one liner sidewall may be supportable in use by means of a resiliently deformable member coupled to a portion of said liner sidewall distal from liner base. Said at least one liner sidewall may be supportable in use by means of a support coupled to said housing, said support being configured to cooperate with a complementary element coupled to said liner sidewall.

A preferred implementation contemplates the provision of a liner configured and arranged for use with a waste receptacle, the liner having a liner base and at least one liner sidewall supportable in use so as to be generally upstanding from said liner base, the liner base and said at least one liner sidewall cooperating to define an internal liner void for the receipt of animal litter, the liner further comprising a pocket for the storage of a litter scoop, said pocket being provided on an external face of the at least one liner sidewall that is adjacent an internal face of said at least one housing sidewall when the liner is inserted into said internal housing void.

Another preferred implementation contemplates the provision of a litter scoop configured for use with a waste receptacle, the litter scoop comprising: a blade-like main portion having a plurality of apertures through which unused animal litter can pass; first and second sidewalls moveably coupled to respective opposite longitudinal sides of said main portion; first and second end walls moveably coupled, respectively, to said first and second sidewalls, and first and second handle portions moveably coupled longitudinally to one another and at respective first ends to said first and second end walls; wherein the scoop is reconfigurable between a storage configuration in which the scoop is generally planar and a use configuration where the sidewalls and end walls are inclined relative to said base, reconfiguration of said scoop between said storage configuration and said use configuration being effect by drawing the first and second handle portions towards one another to thereby draw the first and second end walls and the first and second sidewalls together.

Another implementation contemplates the provision of a liner for a waste receptacle, the liner comprising a base and at least one sidewall supportable so as to be upstanding from the base in use, the liner base and at least one sidewall cooperating to define a void for the receipt of animal litter; wherein said liner base includes a pocket for the receipt of a liner support; said liner support being operable, when received in said liner support pocket, to maintain said liner base in a generally planar configuration.

In another envisaged arrangement there is provided a waste receptacle for animal excreta, the waste receptacle comprising: a housing having a base and at least one sidewall upstanding from the base so as to define an internal receptacle void in which a receptacle liner can be provided; and a receptacle liner insertable into said internal receptacle void, the receptacle liner having a liner base and at least one liner sidewall supportable in use so as to be upstanding from said liner base, the liner base and said at least one liner sidewall cooperating in use to define an internal liner void for the receipt of animal litter; wherein the housing and the liner each comprise access ports that cooperate with one another when the liner is received within said internal receptacle void to allow an animal to enter the housing and access litter provided within said liner void, the liner base further comprising a pocket for the receipt of a liner support; said liner support being operable, when received in said pocket, to maintain said liner base in a generally planar configuration.

It is also envisaged to provide a liner that comprises a pocket for the storage of a litter scoop, said pocket being provided on an external face of the at least one liner sidewall, which external face is arranged to be adjacent an internal face of a waste receptacle housing sidewall when the liner is inserted into an internal receptacle void of a storage receptacle.

Another arrangement contemplates the provision of a platform and liner support, the platform and liner support being configured for attachment to waste receptacle wall, the support comprising a planar element for supporting a platform and one or more liner supports configured to co-operate with a liner sidewall to support said liner sidewall.

The liner support may comprise a recess into which a resiliently deformable member coupled to said liner sidewall may be fitted. The liner support may comprise at least one hook and the liner may comprise a complementary eye so that the liner can be supported by said hook.

Other features, advantages and features of aspects of the apparatus disclosed will be apparent from the following detailed description.

BRIEF DESCRIPTION OF THE DRAWINGS

Various aspects of the teachings provided in this document, and arrangements embodying those teachings, will hereafter be described by way of illustrative example with reference to the accompanying drawings, in which.

DETAILED DESCRIPTION

Figure 1:
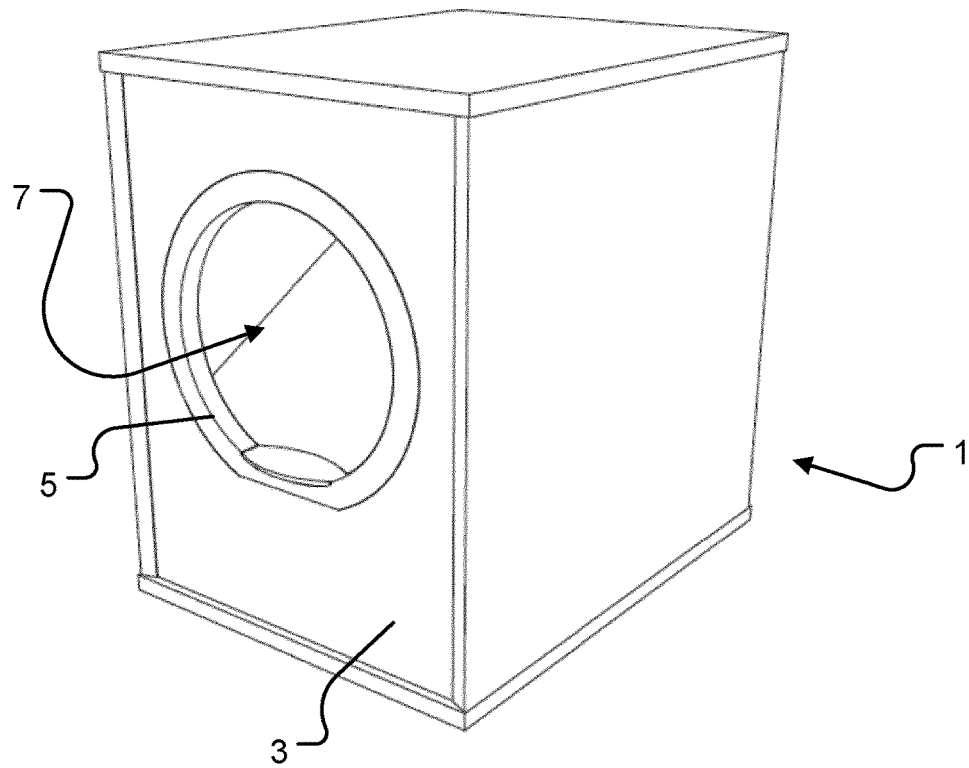
FIGS. 1 and 2 are schematic perspective views of an illustrative waste receptacle.

FIG. 1 is a schematic perspective view of a waste receptacle 1. The waste receptacle comprises a housing that is (in this implementation) generally cuboid in form and includes a door panel 3 in which an access port 5 has been provided, so that an animal such as a cat can access an interior void 7 of the waste receptacle.

Figure 2:
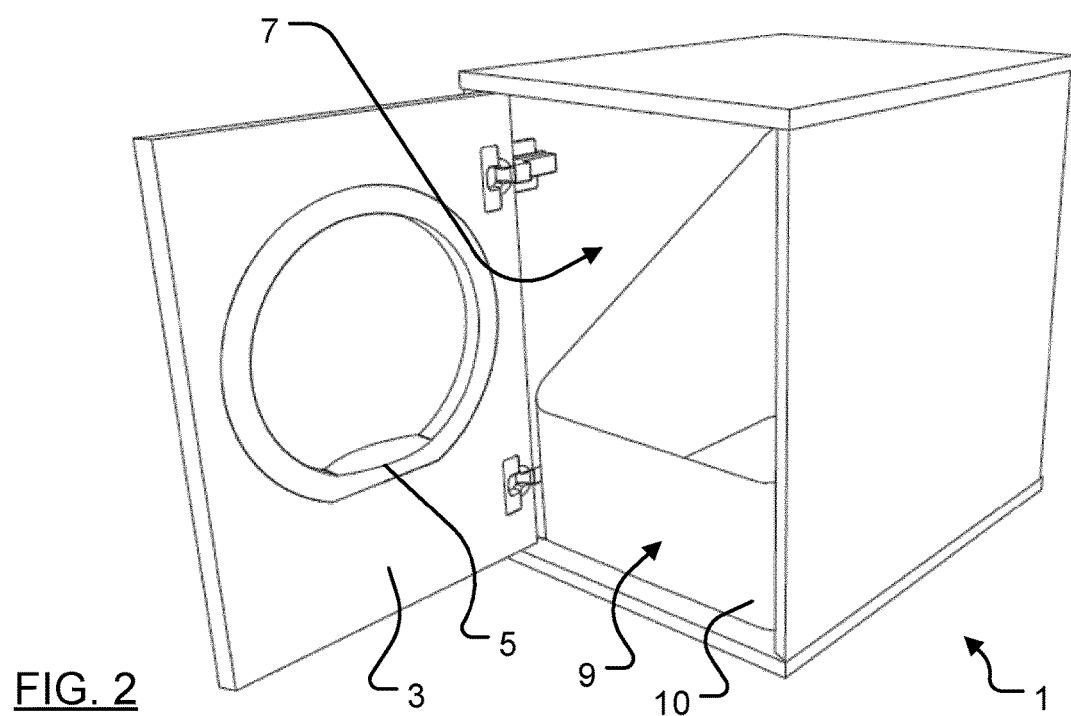

As shown in FIG. 2, the door panel 3 can be opened to enable a user to access the void defined by the receptacle 1. A liner 9 fits within the void 7, and can be accessed by an animal via the access port. In use, the liner 9 defines a liner void that will typically contain a measure of litter material. As will later be described in detail, in this particular implementation the liner is self-supporting and comprises a resiliently deformable member that can be deformed to enable the liner to be inserted into and removed from the void. Once the liner has been inserted, the resiliently deformable member returns to its' original shape to hold the liner by means of friction against the internal walls of the receptacle. One such illustrative deformable member comprises a length of spring steel formed into a hoop and located inside an upper peripheral portion (as orientated in use) of the liner.

Figure 3:
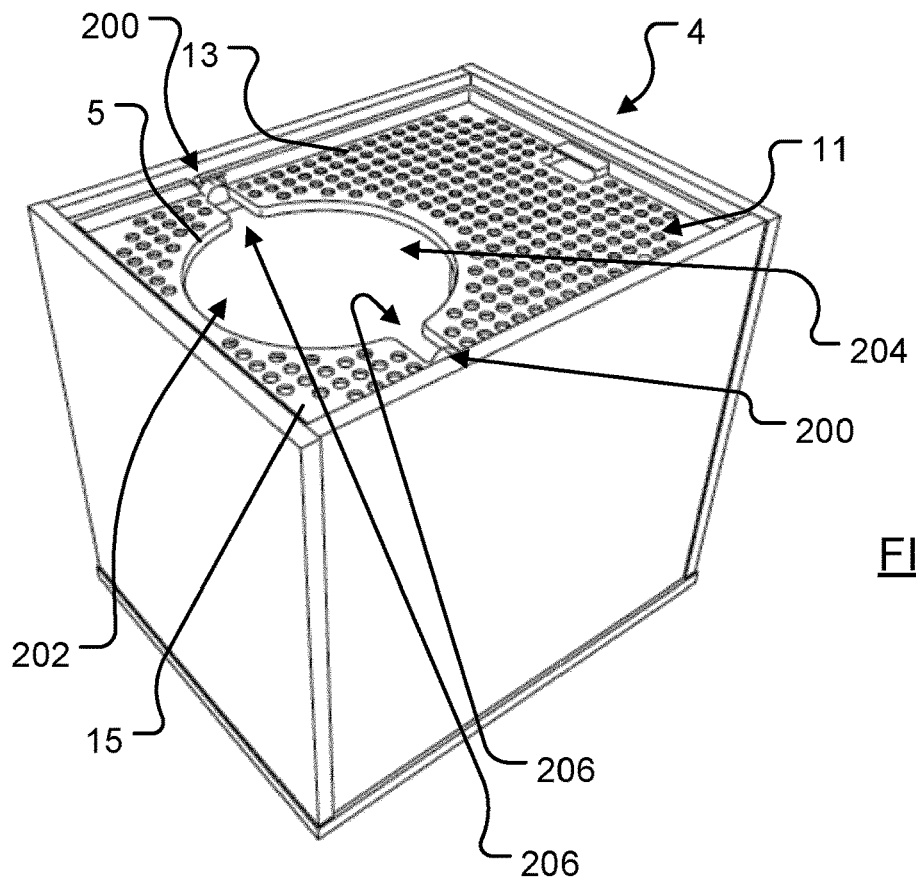
FIGS. 3 and 4 are schematic perspective views of another illustrative waste receptacle.

FIG. 3 is a perspective view of another waste receptacle 4. This receptacle 4 differs from that of FIGS. 1 and 2 in that the access port 5 is provided in a removable platform 11 that forms a top cover of the receptacle in use. The receptacle 44 of FIG. 2 is a top-entry waste receptacle, whereas the receptacle of FIGS. 1 and 2 is a front- or side-entry waste receptacle.

Figure 4:
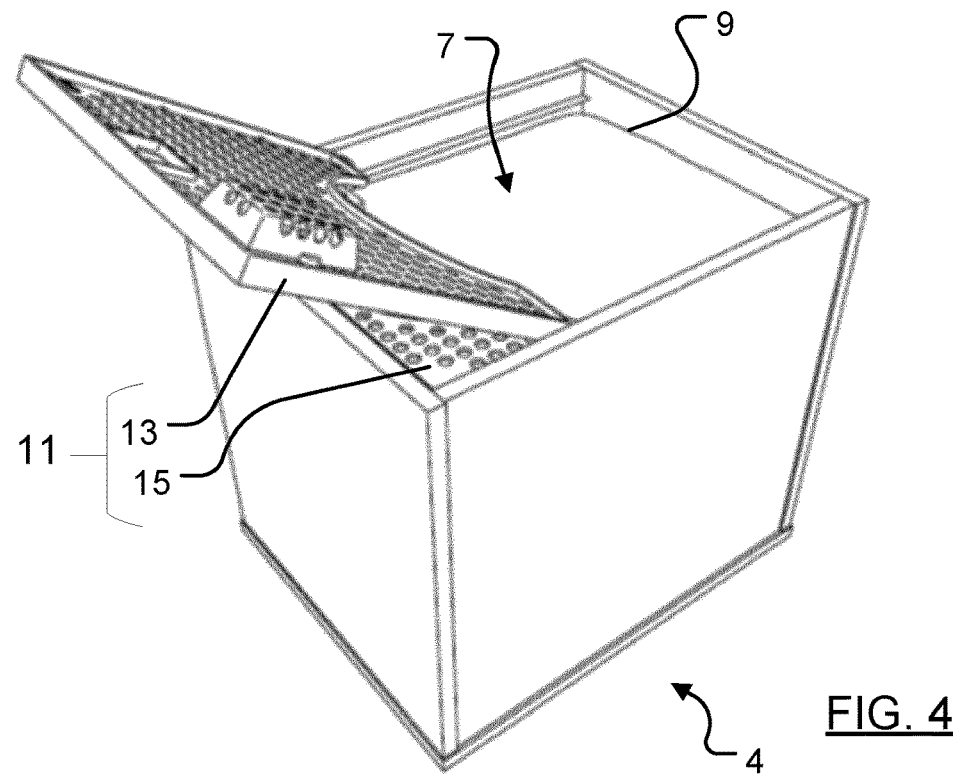

The platform 11 comprises a major portion 13 and a minor portion 15 that are, in this arrangement, hingedly coupled to one another so that the major portion can be pivoted— relative to the minor portion—between a closed position depicted in FIG. 3 where a pet owner's access to the liner 9 (other than via the access port 5) is obstructed and an open position depicted in FIG. 4 where access can be had to the liner 9.

As shown in FIGS. 3 and 4, the major and minor portions 13, 15 of the platform 11 are coupled to one another by hinges 200. Respective adjacent peripheral walls of the major and minor portions of the platform 11 each include a recess 202, 204. The recesses 202, 204 cooperate to provide the access port 5. In addition, the major and minor portions 13, 15 of the platform are spaced from one another to form a lateral gap 206 that extends from one lateral side of the platform to the other.

In the event that any litter should be carried onto the top of the platform, pivoting one portion of the platform towards the other will cause that litter to fall towards the gap 206 and/or access port 5, and thence into the void of the receptacle 4.

In the particular example depicted in FIGS. 3 and 4, the liner 9 includes a resiliently deformable band inside an upper peripheral portion of the liner. The band is sized so that it bears, in its non-deformed state, against internal walls of the receptacle to keep the peripheral walls of the liner from collapsing.

Figure 5:
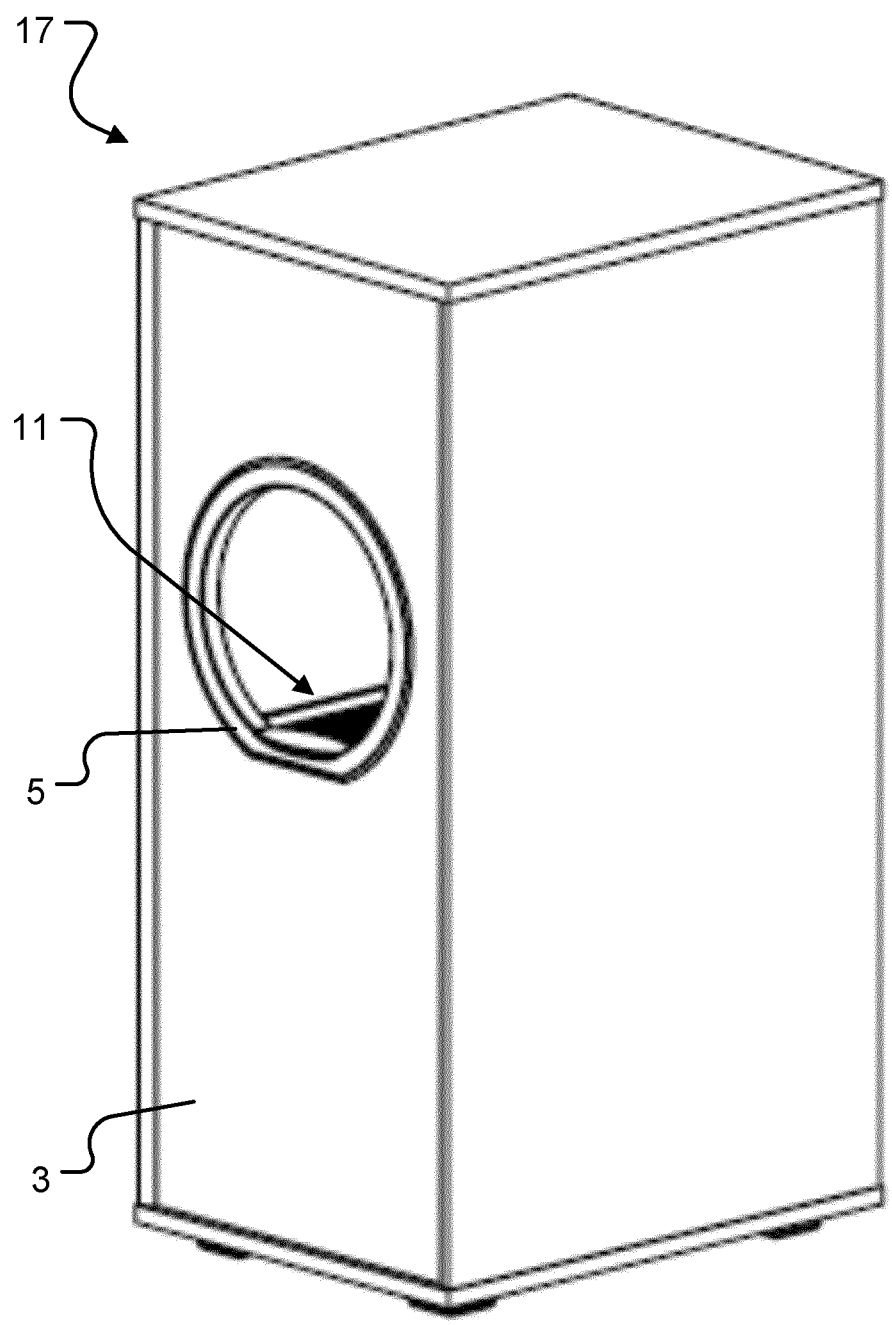
FIG. 5 is a schematic perspective view of yet another illustrative waste receptacle.

FIG. 5 is an illustrative perspective view of another waste receptacle 17. This receptacle 17 includes a platform 11 which is enclosed within the interior void defined by the receptacle 17. The receptacle, in this instance, comprises a door panel 3 in which an access port 5 has been provided. The platform 11 includes a platform access port (not visible) so that an animal entering the receptacle can access a liner (also not visible) provided beneath the platform. The platform 11 could be of the type shown in FIGS. 3 and 4, or could simply comprise a planar body with a platform port provided in it. Access to the liner and platform by an owner is enabled by means of the aforementioned door panel 3, which can be opened.

Figure 6:
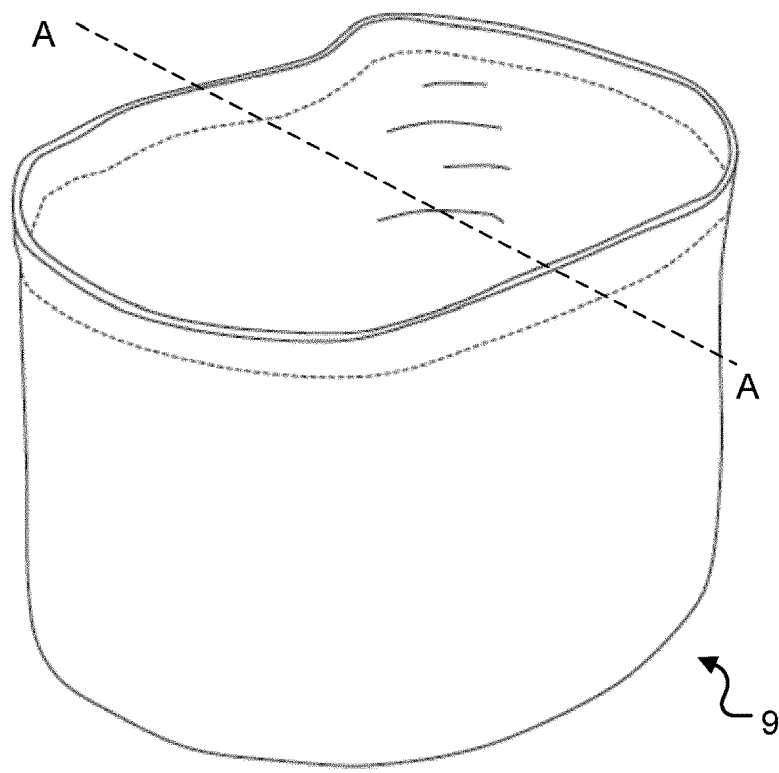
FIG. 6 is a schematic front perspective view of a liner for a waste receptacle.
Figure 7:
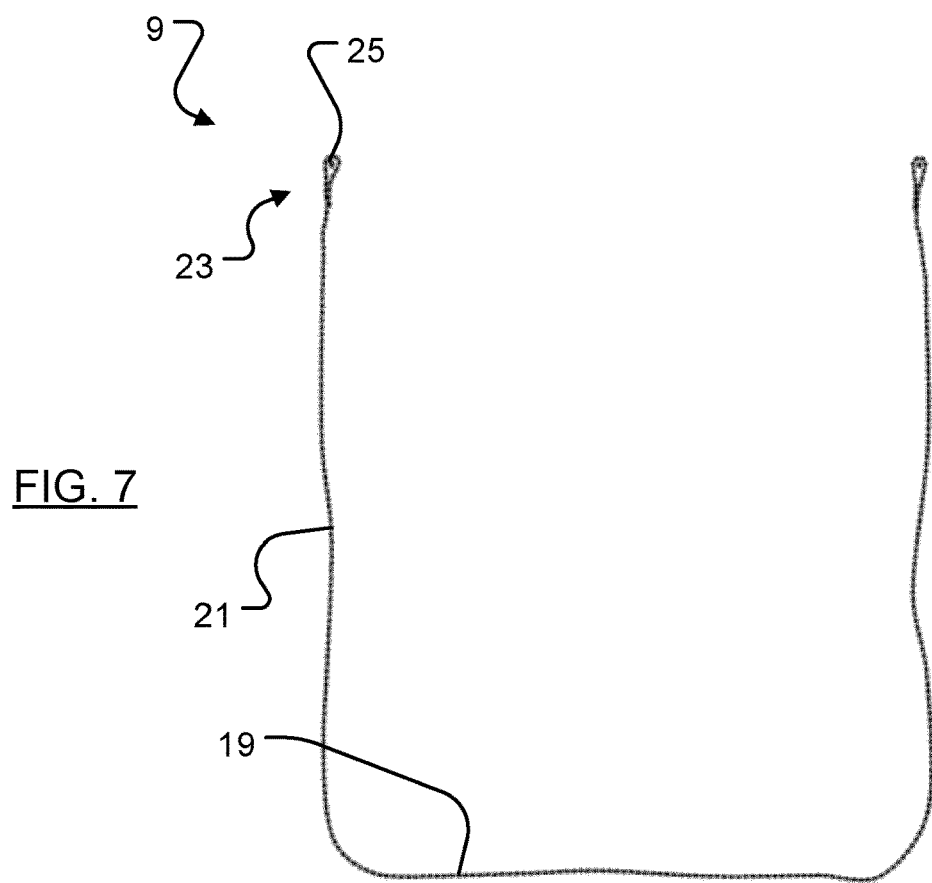
FIG. 7 is a cross-sectional view along the line A-A of FIG. 6.

FIG. 6 is a schematic view of an illustrative liner 9, and FIG. 7 is a schematic cross-sectional view along the line A-A of FIG. 7. The liner may be manufactured of a variety of different materials, for example of a textile material, a plastics material or a textile/plastics mix, and is preferably waterproofed (either inherently or by application of a waterproof layer or component)). The liner comprises a base 19 (not visible in FIG. 6) and one or more sidewalls 21 that cooperate with the base 19 to form a receptacle for a measure of litter tray material (such as "AmazonBasics Cat Litter Wood Pellets" available from http://www.Amazon-.co.uk., or similar). The liner is open at an end remote from the base 19 (which end will be uppermost in use) so that an animal, for example a cat, can enter inside the liner to urinate or void its' bowels.

As shown in FIG. 7, a peripheral portion 23 of the liner sidewall 21 is folded over to provide a void within which a resiliently deformable retainer 25 is provided. The retainer 25, in this particular embodiment, comprises a hoop of resiliently deformable material (such a sprung steel, for example) that can be deformed to allow the liner to be fitted into a receptacle, whereupon the retainer returns to its non-deformed shape and bears upon internal walls of the receptacle to hold the liner in place in use.

In the preferred embodiment it is envisaged that the retainer comprises a hoop. It will be apparent, however, that the retainer need not necessarily comprise a hoop. For example, a generally C-shaped length of resiliently deformable material may suffice to hold the liner in place in use. Other equivalent arrangements will be apparent to persons of skill in the art.

Figure 8:
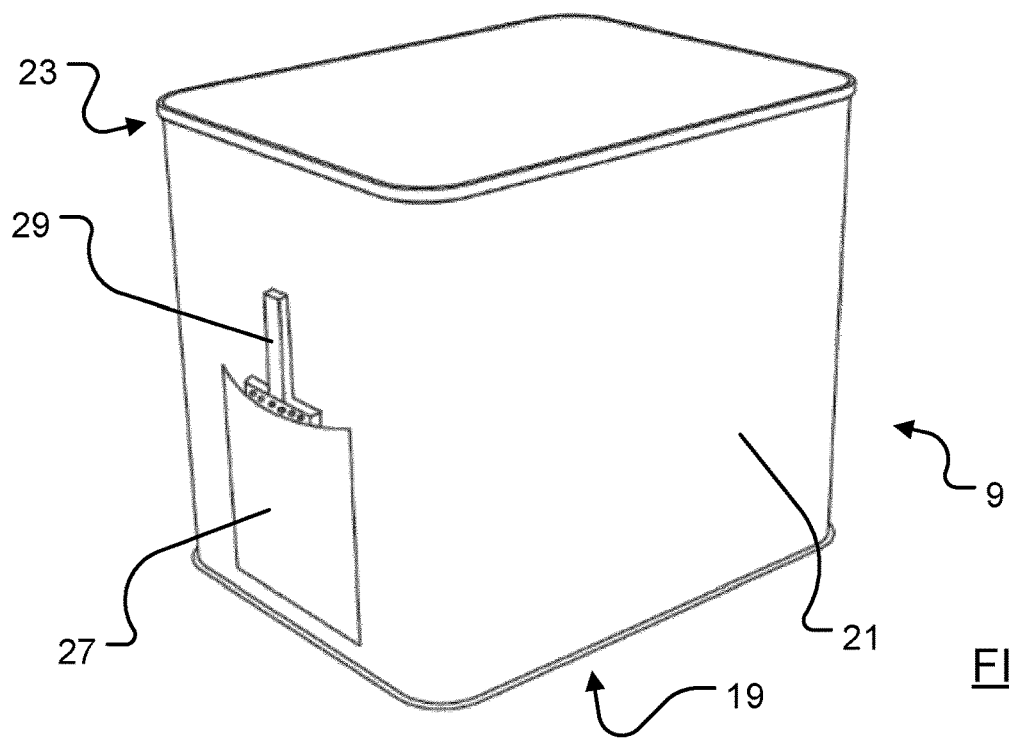
FIG. 8 is a schematic rear perspective view of the liner depicted in FIG. 6.

Referring now to FIG. 8 of the drawings, the line 9 further comprises a pocket 27 provided on an external face of the sidewall 21 so that the pocket will lie between the liner sidewall 21 and an internal face of the receptacle when the liner is located in the receptacle. The pocket 27 is sized to accommodate a scoop 29 for removing pet waste and/or soiled litter from the liner.

Figure 9:
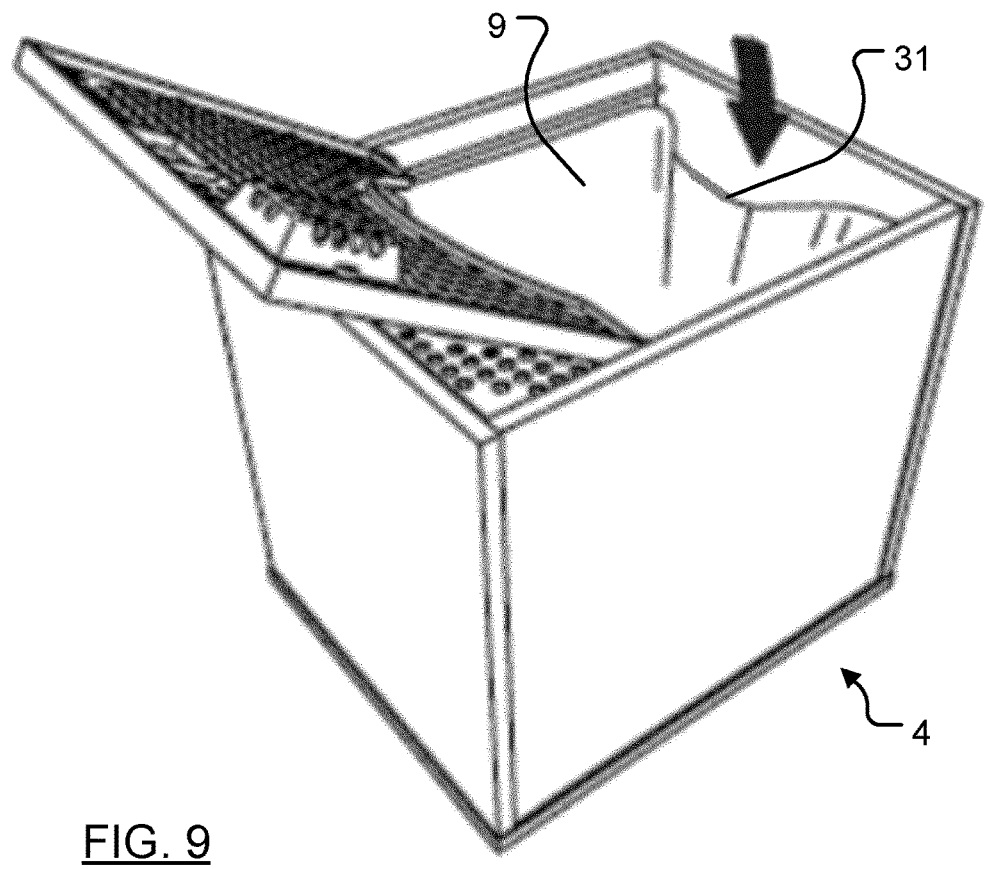
FIG. 9 is a schematic perspective view of a waste receptacle as shown in FIG. 2 that has been equipped with a liner as depicted in FIG. 6.

As shown in FIG. 9, when the liner 9 is installed in a receptacle 3, the aforementioned pocket 27, and any scoop 29 provided therein, is normally obscured from view and access thereto is obstructed by the liner. By pulling a peripheral edge portion 31 of the liner 9 (which edge portion is in the vicinity of the pocket 27) away from the receptacle the pocket is revealed and access can be had thereto. An advantage of this arrangement is that when the liner is provided within the receptacle with the retainer abutting against the internal walls, the pocket and scoop is obscured from view and access thereto is restricted. This means that users no longer need have soiled scoops on view and easily accessible.

Figure 10:
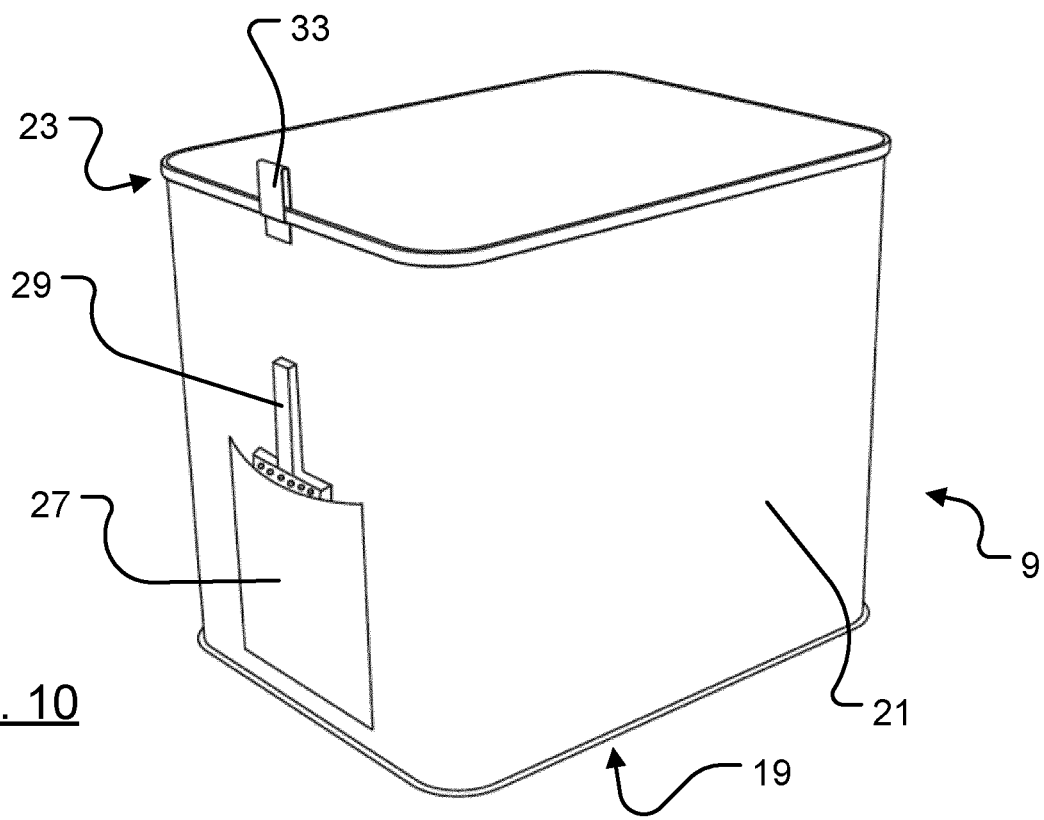
FIG. 10 is a schematic front perspective view of another liner for a waste receptacle.
Figure 11:
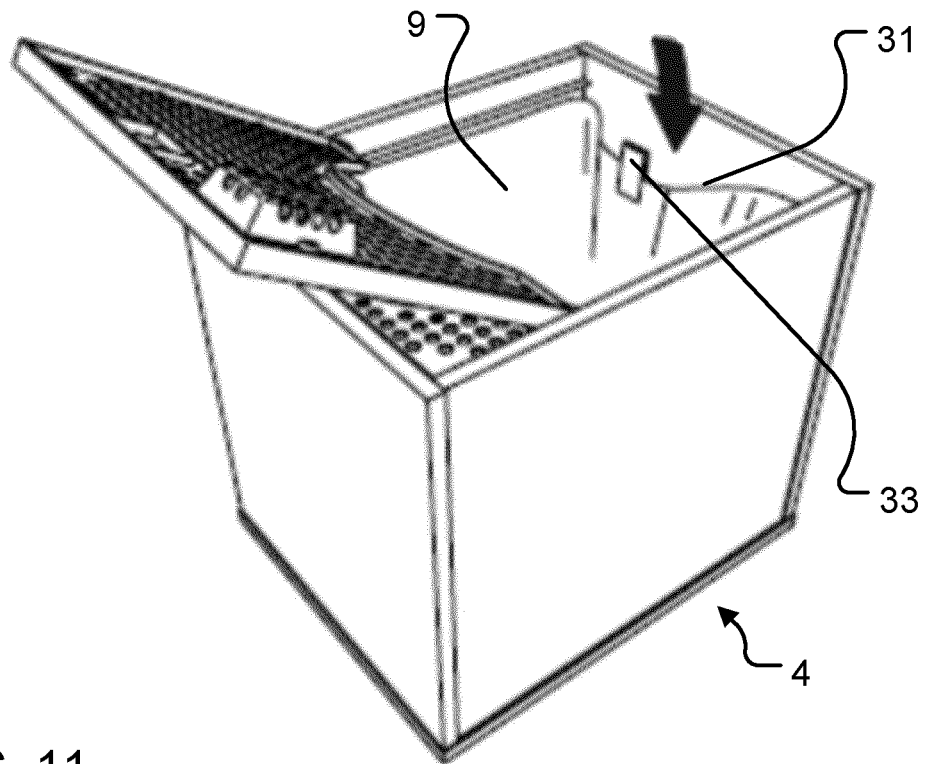
FIG. 11 is a schematic perspective view of a waste receptacle as shown in FIG. 2 that has been equipped with a liner as depicted in FIG. 10.
Figure 12:
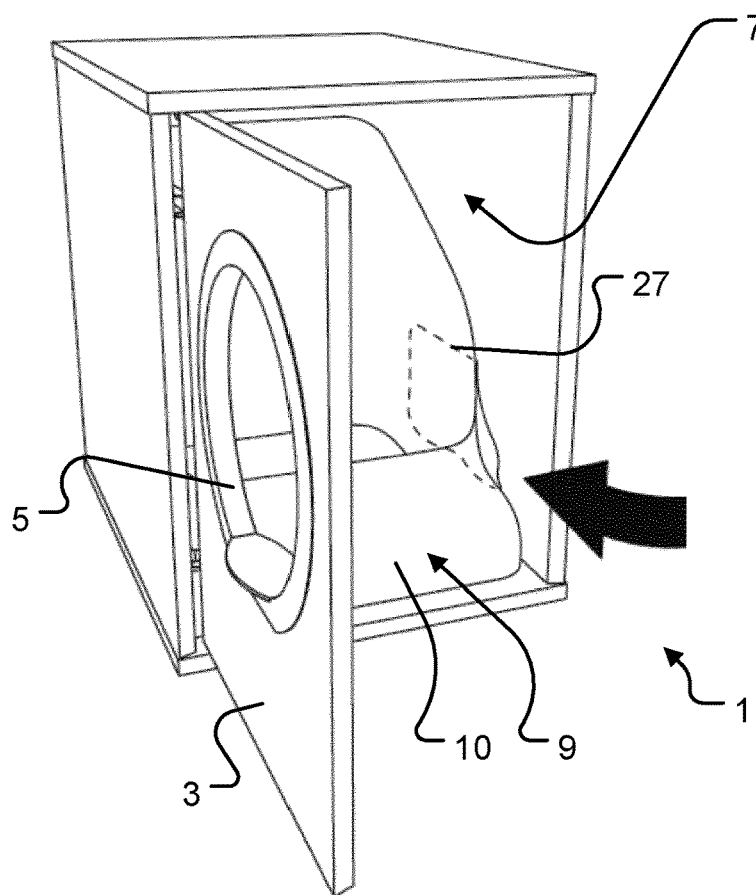
FIG. 12 is a schematic perspective view of a receptacle of the type shown in FIGS. 1 and 2 with a liner installed therein.

FIGS. 10 and 11 show another form of liner where the peripheral edge portion 31 in the vicinity of the pocket is provided with a tab 33 that makes it easier for the user to pull the liner sidewall away from the receptacle. In another envisaged implementation, the tab may be configured to couple to the receptacle sidewall to secure the liner in position in use. To enable this, the tab may carry one part of a two-part engagement mechanism, the other part being carried by the receptacle sidewall. Velcro™ or a press-stud (otherwise known as a snap fastener) could be utilised to secure the liner to the receptacle. Alternatively, the tab could be configured as a hook that hooks over the top of the receptacle sidewall to support the liner in use. FIG. 12 is an illustrative representation of the receptacle of FIGS. 1 and 2 showing a pocket 27 provided in a sidewall of the liner 9.

Figure 13:
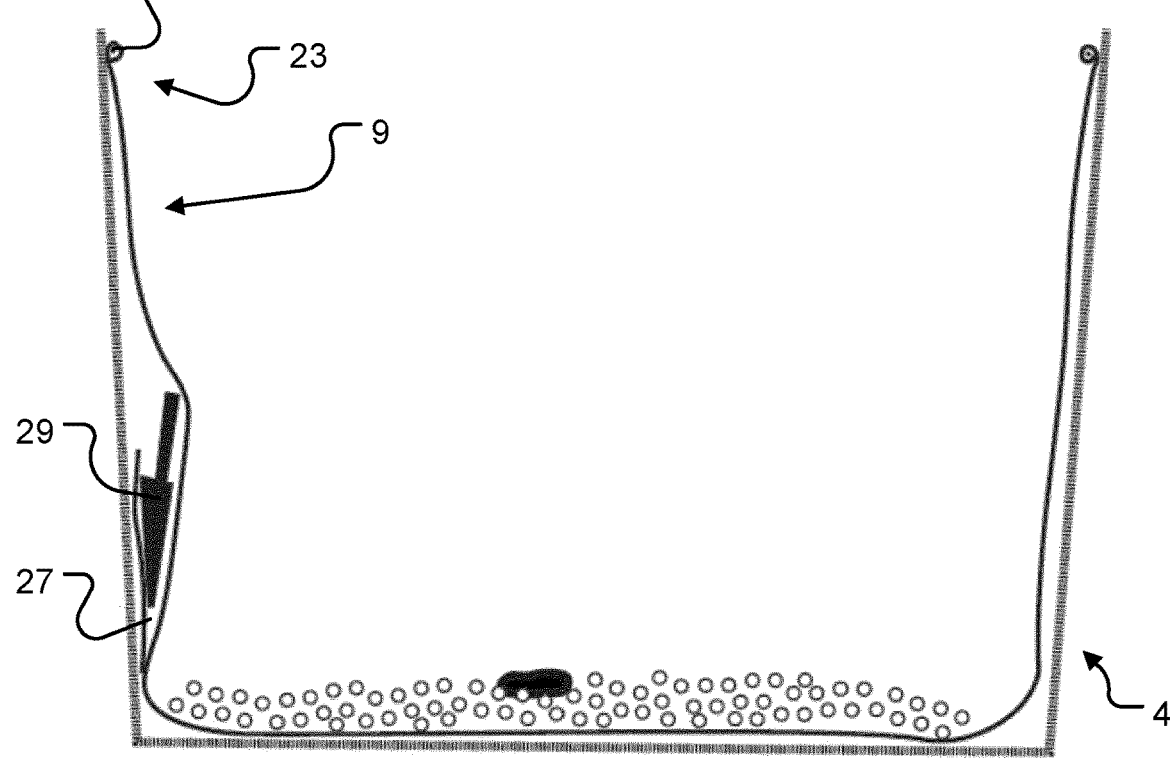
FIG. 13 is a schematic cross-sectional view through an illustrative receptacle and liner.
Figure 14:
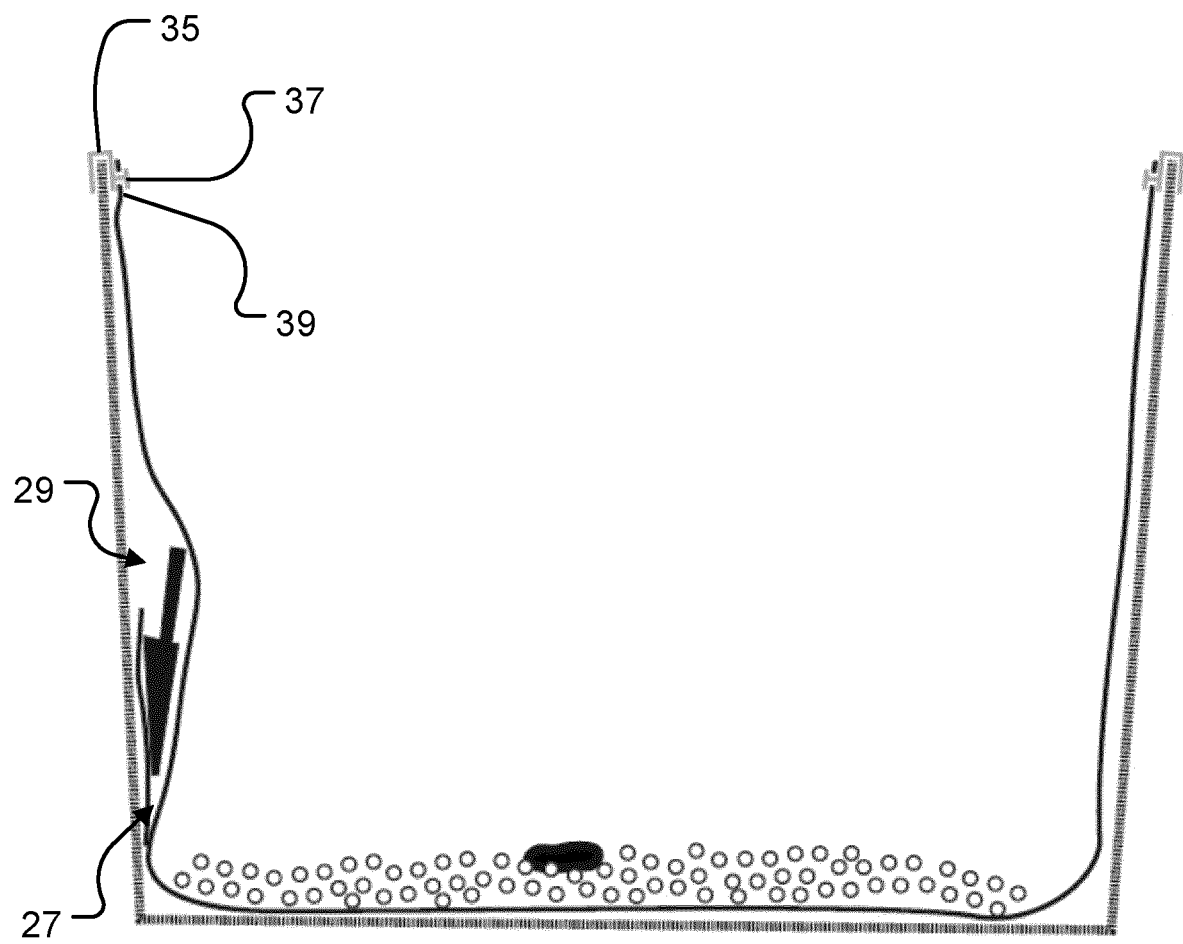
FIG. 14 is a schematic cross-sectional view through another receptacle and liner.

As aforementioned, utilising a retainer 25 to secure a liner 9 against the sidewalls of a receptacle, as shown in FIG. 13, is merely one illustrative way of securing the liner 9 in place in use. In another illustrative implementation shown schematically in FIG. 14, the liner 9 may be configured to couple with retaining clips 35. In this particular example, the clips 35 are configured to hook over the peripheral wall of the receptacle 3. In other arrangement the clips may be configured to engage with the receptacle wall (for example by means of a suitable coupling) or may be permanently attached thereto. The clips 35, in this particular arrangement, include a peg 37 that can be mated with a complementary eyelet 39 in the liner to secure the liner to the peripheral wall of the receptacle. As will be appreciated, other two-part complementary attachment mechanisms may be employed instead of, or as well as, a peg and eyelet.

Figure 15:
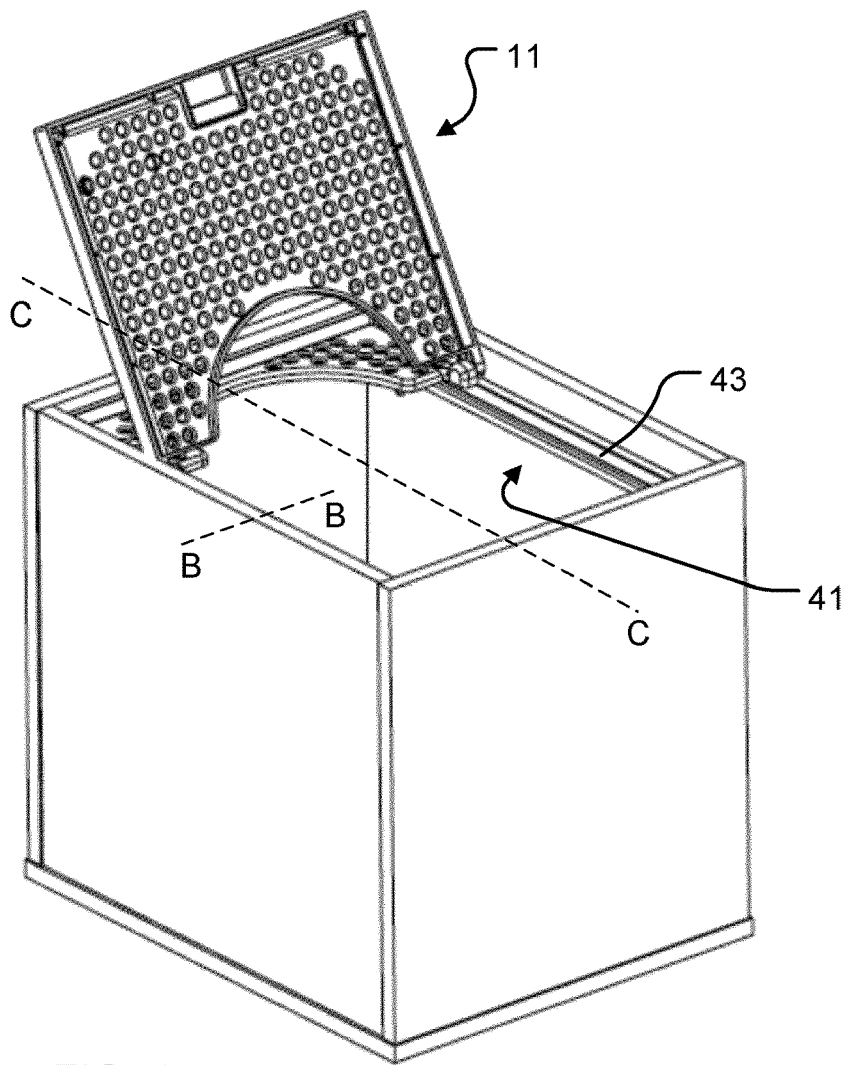
FIG. 15 is a schematic perspective view of another waste receptacle.
Figure 16:
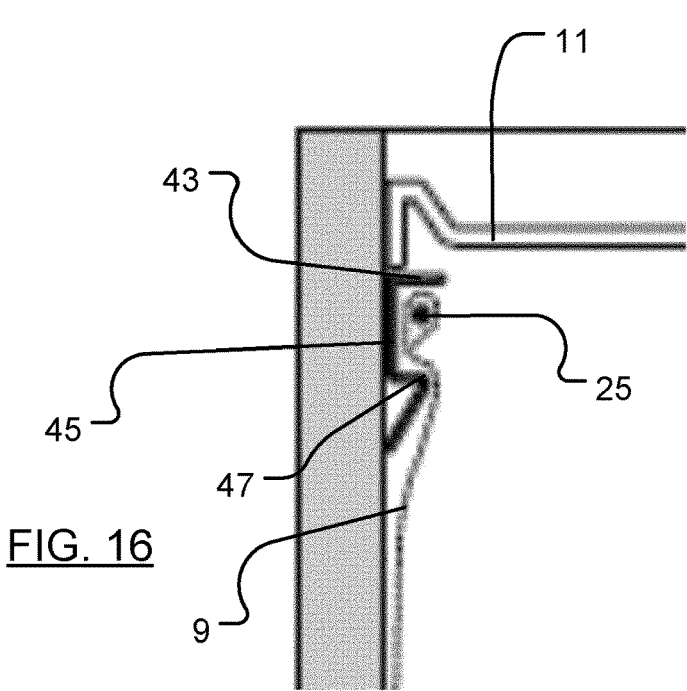
FIG. 16 is an enlarged cross-sectional view, along the line B-B of FIG. 15 through a part of one wall of the receptacle.

Referring now to FIGS. 15 and 16, there is depicted a schematic representation of a platform and liner support 41. The support 41 is configured for attachment (for example by means of an adhesive or fixings such as screws) to an internal surface of the receptacle sidewalls. In one arrangement, the receptacle is generally rectangular in plan view and a support 41 is affixed to each of the longer sidewalls. In another implementation a support may also or alternatively be affixed to the shorter sidewalls. In addition, whilst it is preferred for the support to extend along substantially the entire length of the sidewalls, this may not be necessary, and the support may instead extend only over a part of the length of the sidewall.

Referring now to FIG. 16, the support 41 comprises a ledge 43 that functions as a support for the platform 11. As shown the ledge 43 extends inwardly into the receptacle when the support is affixed to the internal walls thereof. A first wall 45 extends generally perpendicularly from an edge of the ledge 43 that is proximate the sidewall of the receptacle when the support is installed, and a second wall 47 extends generally perpendicularly from an edge of the first wall 45 distal of said ledge 43. The ledge and first and second walls cooperate to form a cavity into which the resiliently deformable retainer 25 of a liner 9 can be fitted so that the liner is supported, in use, with its sidewall upstanding by the support 41. This arrangement makes it less likely for the liner sidewall to collapse during use.

Figure 19:
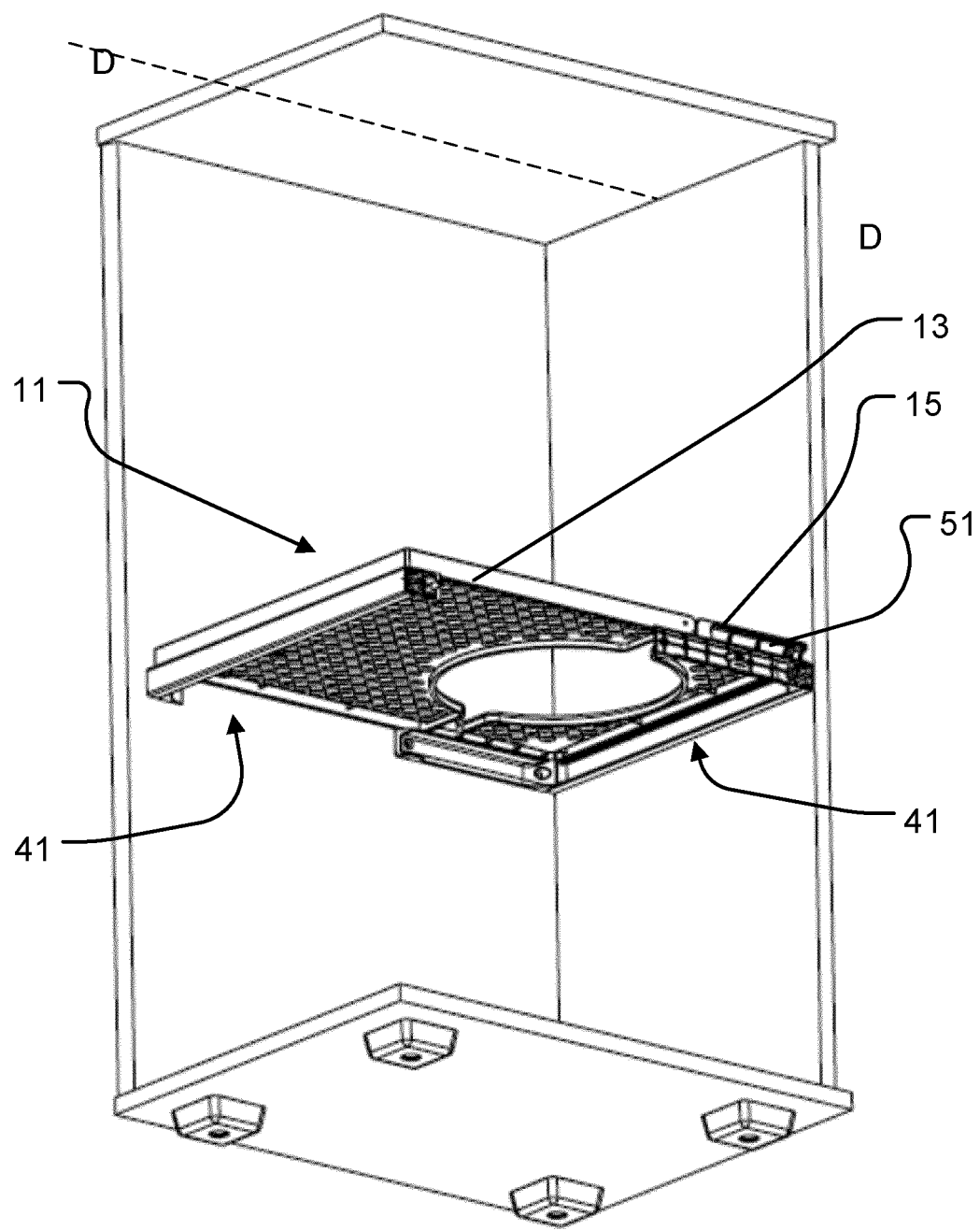
FIG. 19 is a part cut-away view of another waste receptacle similar to that depicted in FIG. 5.
Figure 20:
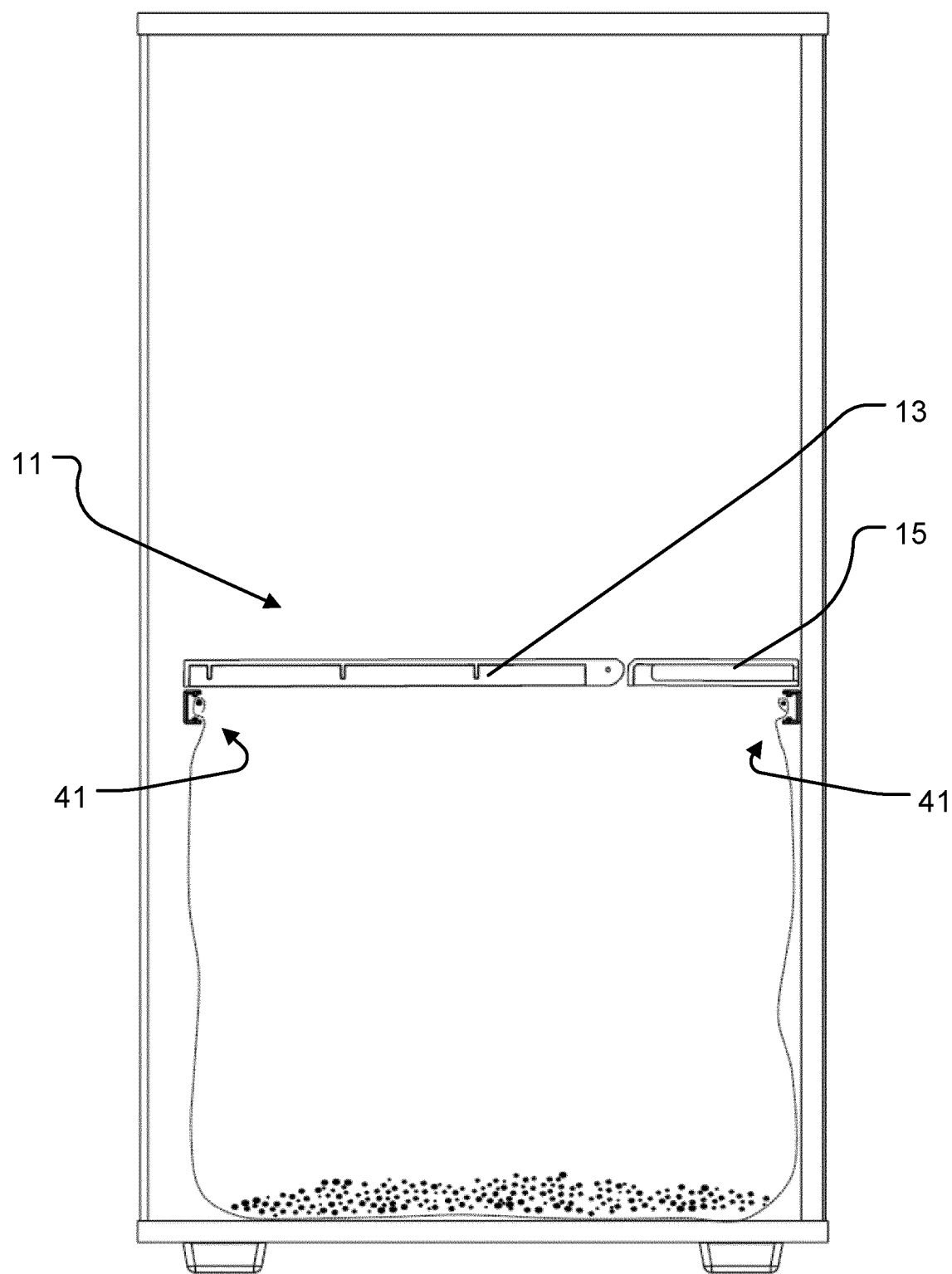
FIG. 20 is a cross-sectional view along the line D-D of FIG. 19.

FIGS. 19 and 20 illustrate, and reinforce, the fact—described above—that it is not essential for the platform and liner support 41 to extend along the entirety of a wall of the receptacle. In the particular example illustrated, the receptacle is generally rectangular in plan view and is provided with supports 41 that extend along the entire length of each shorter wall, and partway along the length of each longer wall.

Figure 17:
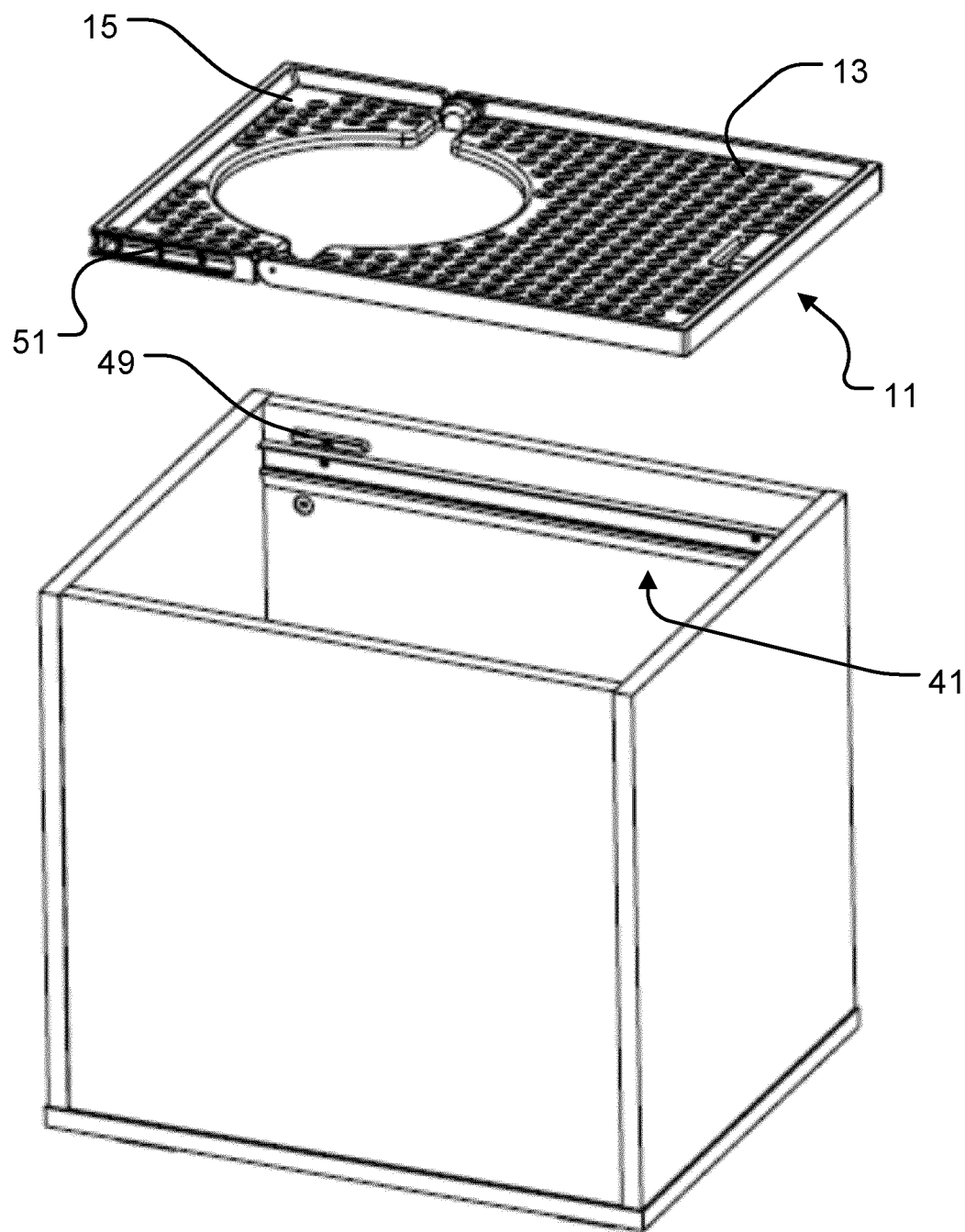
FIG. 17 is an exploded perspective view of the waste receptacle of FIG. 15.
Figure 18:
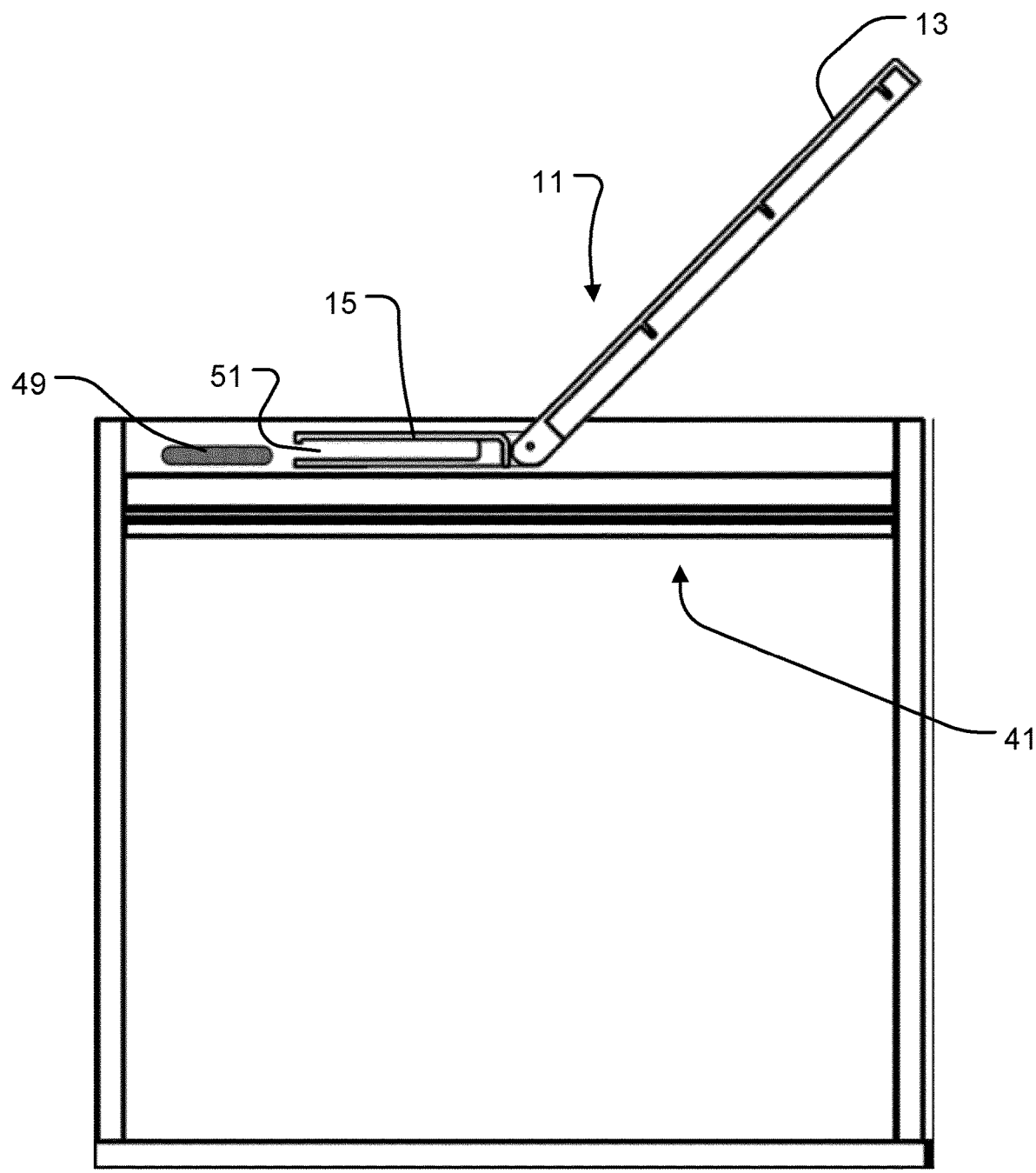
FIG. 18 is a cross-sectional view along the line C-C of FIG. 15.

Referring now to FIGS. 17 and 18, the receptacle may further comprise a platform retainer 49 that cooperates with a complementary formation 51 in—in this particular case—the minor portion 15 of the platform 11, to help retain the platform 11 in place. The complementary formation 51 comprises a generally rectangular recess and the platform retainer comprises a generally rectangular body that can fit within the recess. In the preferred arrangement a recess is provided on either peripheral edge of the minor portion 15 of the platform 11 for cooperation with complementary formations on either side of the receptacle.

As depicted in FIG. 18, the minor portion 15 of the platform can be slid along the ledge 43 of the platform and liner support 41 until the platform retainer 49 affixed to the sidewall of the receptacle locates in the complementary formation 51 provided in the minor portion 15 of the platform 11. Once so located, the platform is less likely to be dislodged, for example by means of a cat stepping onto it.

Figure 21:
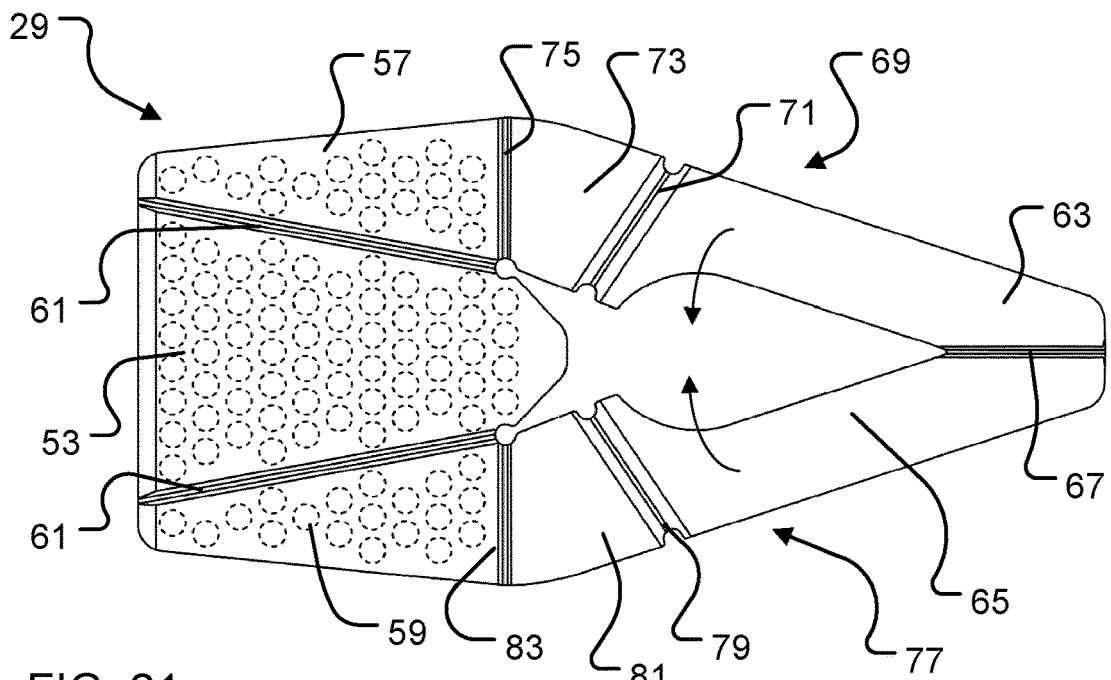
FIGS. 21 and 22 are plan and perspective views, respectively, of a scoop.
Figure 22:
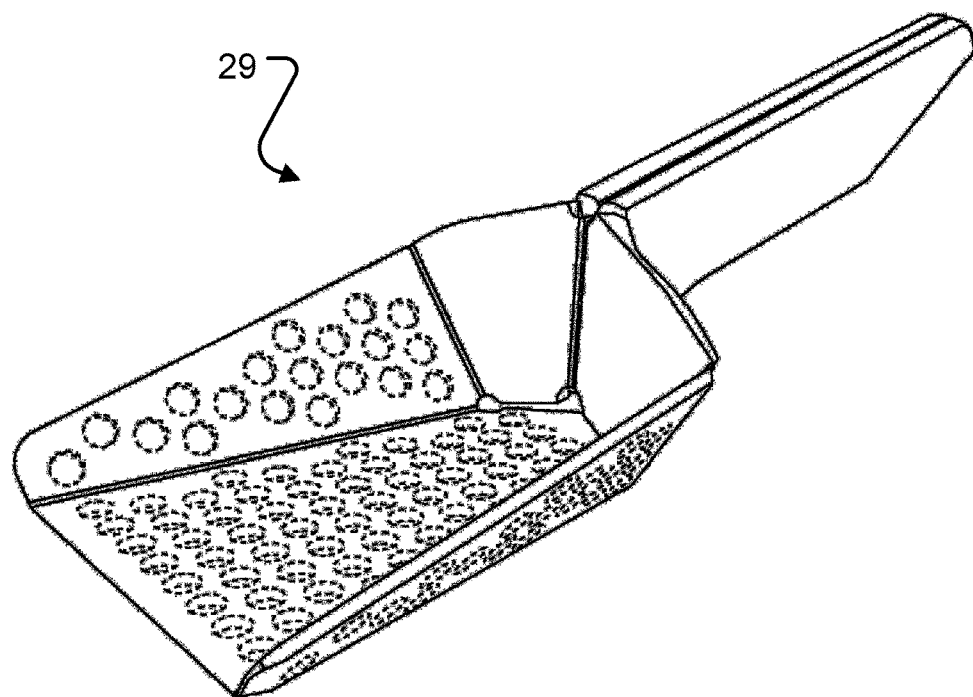

Referring now to FIGS. 21 and 22, there is depicted a scoop 29 that is particularly well suited for use with the liner described herein. FIG. 21 is a plan view of the scoop in which the scoop is substantially planar (and hence can easily be slid into a pocket provided on the outside of a liner). FIG. 22 is a perspective view of the scoop of FIG. 21 after it has been manipulated to form a three dimensional body.

The scoop comprises a base portion 53 that is, in the preferred arrangement, perforated so that unsoiled litter can fall through the base and back into the liner. Peripheral lateral edges of the base 53 are coupled to respective first and second side panels 57, 59, in this instance by means of living hinges 61.

First and second handle portions 63, 65 are coupled together, in this instance by a living hinge 67. A first end 69 of the first handle portion 63 is coupled via a living hinge 71 to a first end wall 73 that is coupled by another living hinge 75 to the first side panel 57. Similarly a first end 77 of the second handle portion 65 is coupled via a living hinge 79 to a second end wall 81 that is coupled by another living hinge 83 to the second side panel 59.

As will be appreciated, bringing the two handle portions 63, 65 together causes the sidewalls 57, 59 to move relative to the base portion 53 towards one another and the two end walls 73, 81 to come together; thereby forming a three-dimensional scoop as shown in FIG. 22.

Figure 23:
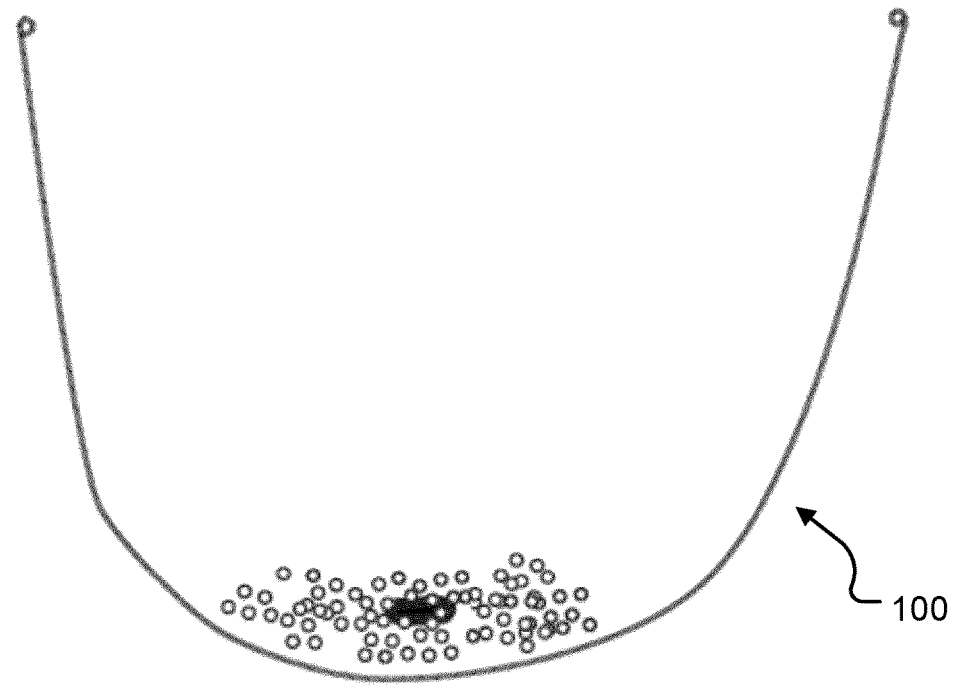
FIG. 23 is a schematic cross-sectional view through a previously proposed liner that has been lifted out of a receptacle.

Referring now to FIG. 23, a problem with existing liners 100 is that when the liner is lifted out of the receptacle, the base of the liner tends to sag. As a result, unused litter, soiled litter and animal excreta tend to pool in the bottom of the liner, making it difficult for the user to remove excreta and soiled litter with a scoop. It is also the case that the base of the liner can be prone to rucking by the animal in use.

Figure 24:
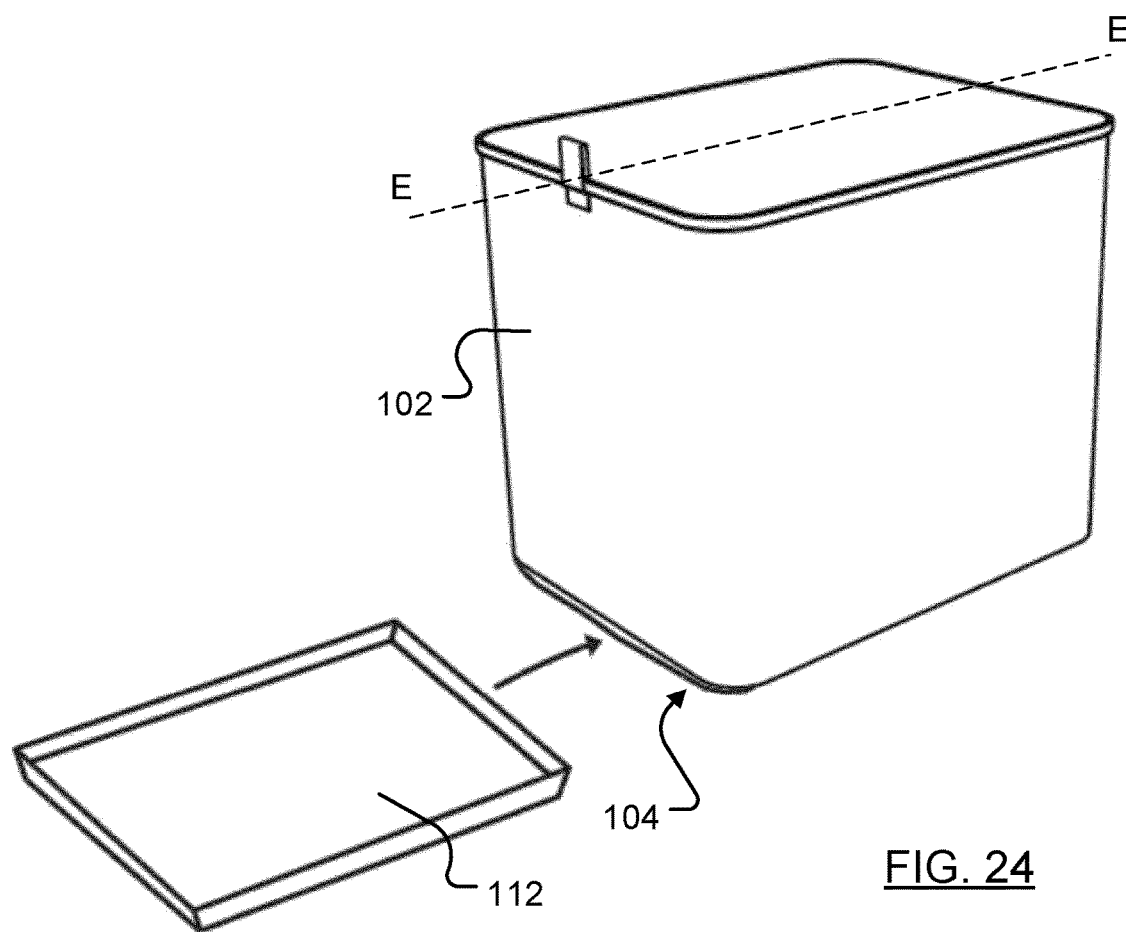
FIG. 24 is a schematic perspective view of another liner.
Figure 25:
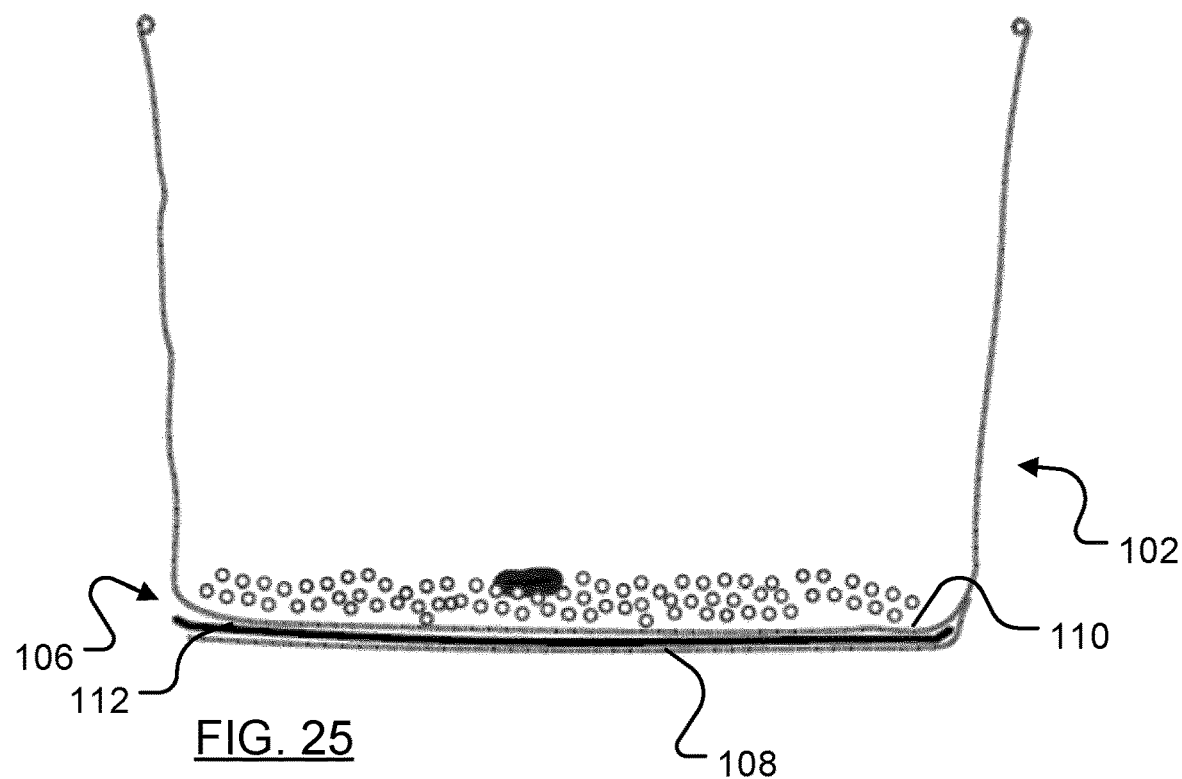
FIG. 25 is a cross-sectional view along the line E-E of FIG. 24.
Figure 26:
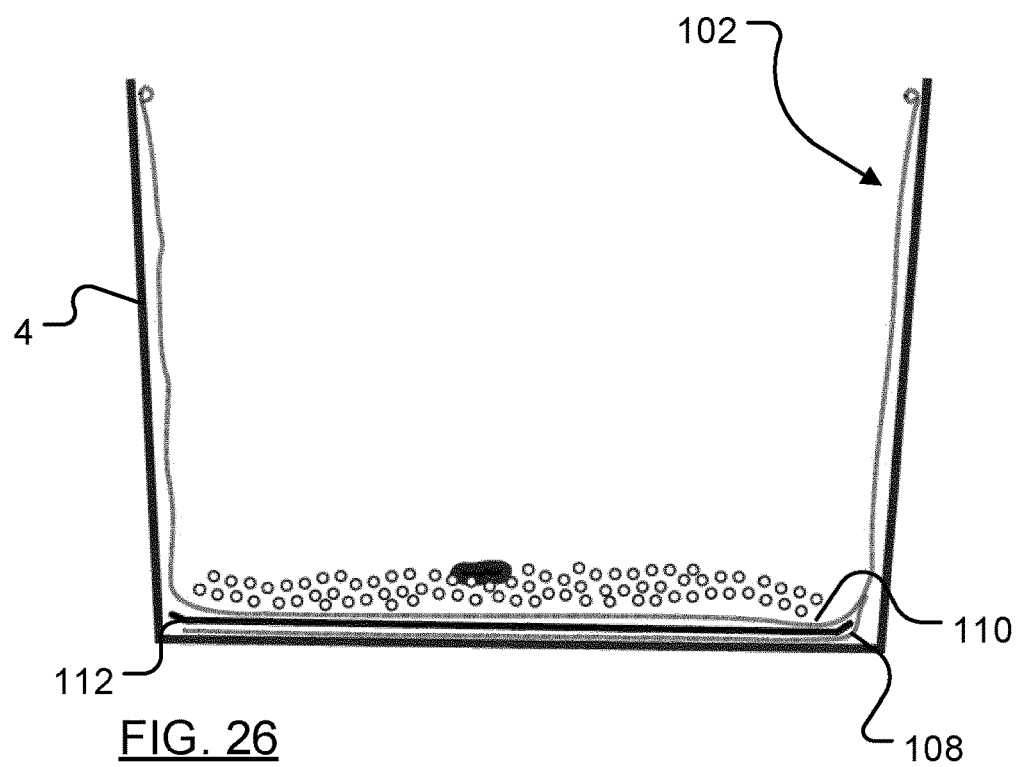
FIG. 26 is a cross-sectional view of a liner of the type depicted in FIGS. 24 and 25 installed in a waste receptacle.

To address this issue, as shown in FIGS. 24 to 26, it is proposed to provide a liner 102 that includes a housing 104 for a base reinforcing member 112. In this particular example, the housing 104 comprises a base pocket 106 formed by coupling an additional base panel 108 to a primary base portion 110 of the liner 102. As shown in FIG. 24 a reinforcing member 112 can be inserted into the base pocket to reduce the likelihood of the base sagging when the liner is removed from a receptacle. Since the reinforcing member can be removed from the base pocket, users are still able to turn the liner inside-out whilst cleaning it. Another advantage of this arrangement is that the reinforcing member helps to reduce the likelihood of the base 110 rucking whilst the receptacle is being used by an animal.

In this example the pocket is closed at one end, but it will be appreciated that the pocket could be more akin to a sleeve and open at both ends. Similarly, whilst a tray-like configuration for the reinforcing member is envisaged, the reinforcing member could have a variety of different configurations. The liner 102 may include a pocket for a scoop as in other embodiments described herein, and may—as shown in FIG. 26—include a resiliently deformable retainer of the type that is elsewhere described herein. Alternatively, the liner may be configured to couple to clips, for example as with the liner depicted in FIG. 14.

Figure 27:
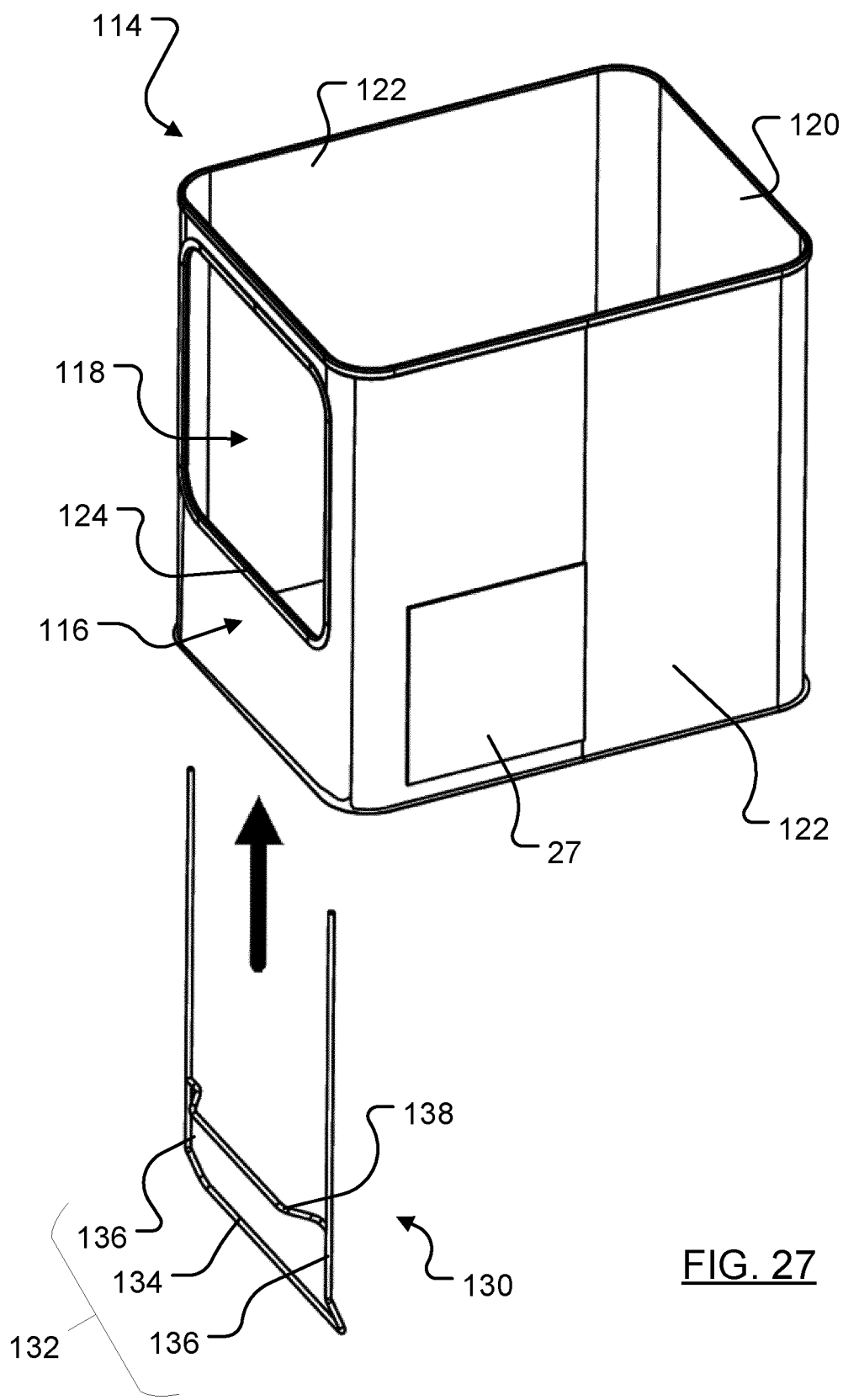
FIG. 27 is a schematic perspective view of another liner.
Figure 28:
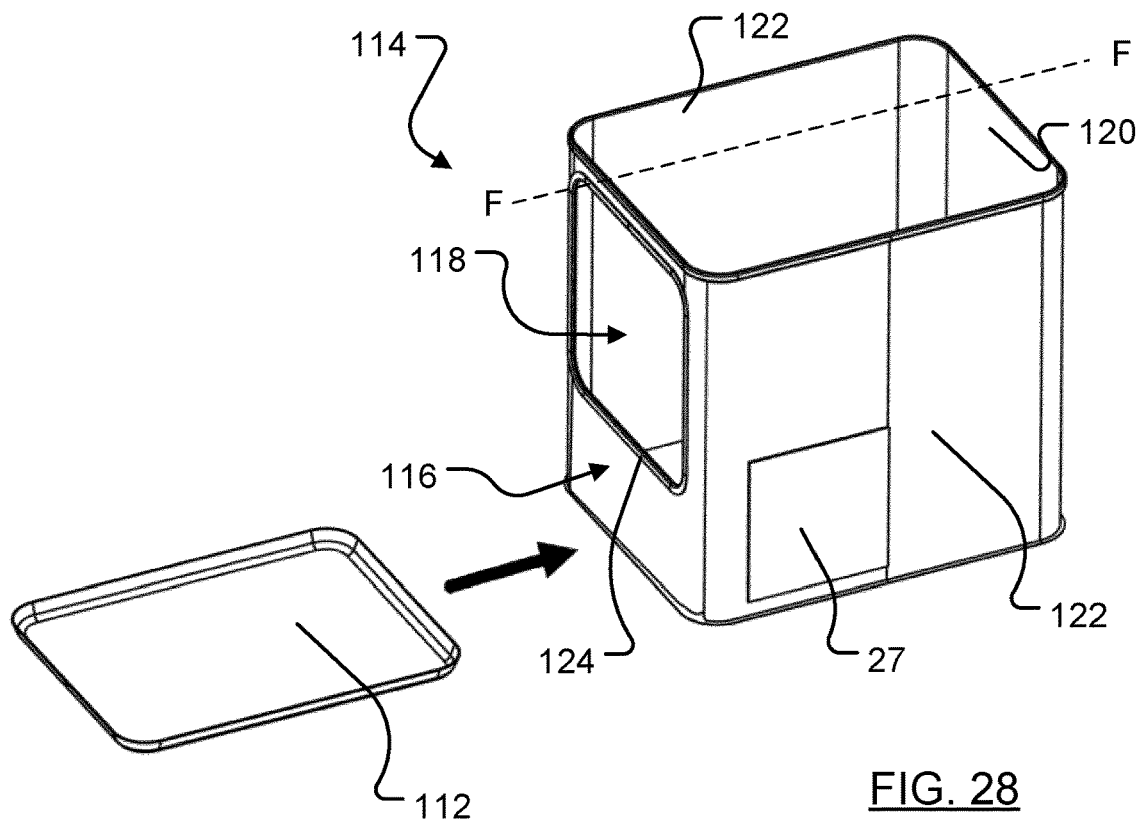
FIG. 28 is another view of the liner depicted in FIG. 27.
Figure 29:
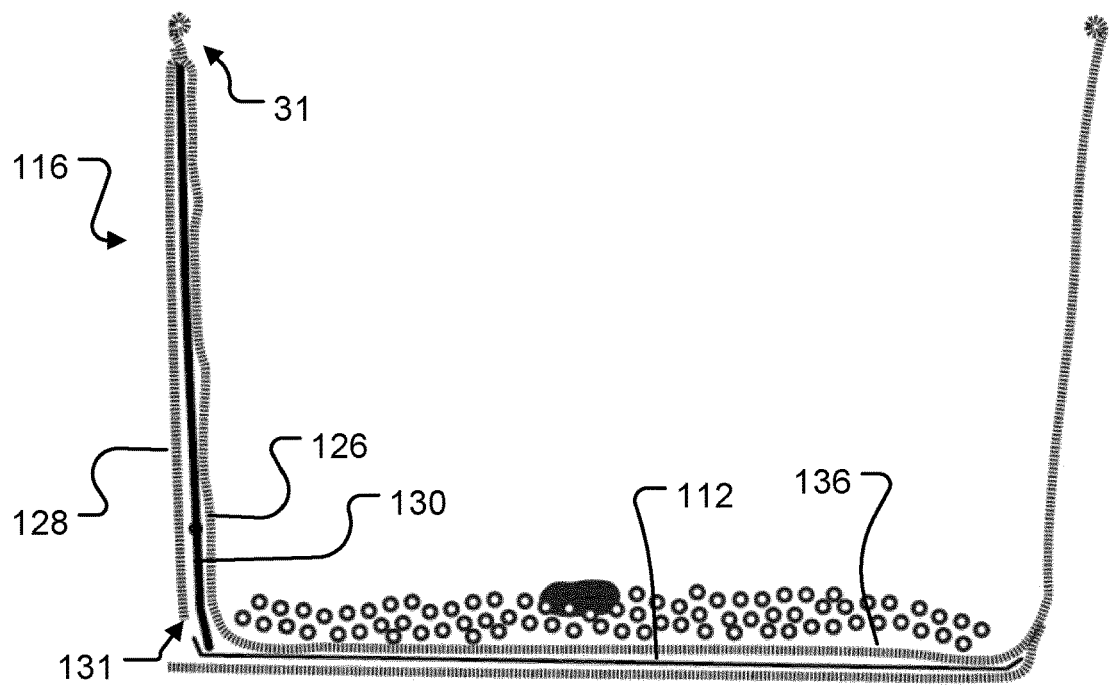
FIG. 29 is a cross-sectional view of the liner depicted in FIGS. 27 and 28 along the line F-F in FIG. 28.

Another embodiment of a liner 114 is depicted schematically in FIGS. 27 to 29 of the accompanying drawings. This liner 114 is particularly, but not exclusively, intended for use with waste receptacles 1 of the type shown in FIGS. 1 and 2. As shown in FIGS. 1 and 2, the liner 9 described above has a front wall 10 (as orientated in use) that is lower than a rear wall (not visible) of the liner so that an animal can clamber into the liner via the port 5 in the door 3. Whilst this arrangement functions adequately, the front wall of the liner can sometimes be caught by the animal as it clambers into the waste receptacle and pulled away from the depicted upright position. This raises the possibility of litter falling in between the liner and the door to the receptacle.

The liner 114 depicted in FIGS. 27 to 29 includes a front wall 116 (as orientated in use) that is substantially the same height as a rear wall 120 and interconnecting sidewalls 122. The front wall 116 includes an access port 124 that aligns with the access port 5 in the door 3 when the liner 114 is installed in a waste receptacle 1.

The front wall 116 is comprised of an inner wall 126 that extends between respective interconnecting walls 122, and an outer wall 128 that is coupled to the inner wall around the periphery of the access port 124, towards the peripheral edge portion 31, and to the remainder of the liner at opposite lateral peripheries. The inner and outer walls 126, 128 co-operate to provide a housing for a front wall reinforcing member 130. In this particular example, the housing comprises a pocket 131 that opens towards a base wall 134 of the liner 114.

The reinforcing member 130, in this embodiment, comprises a generally U-shaped outer frame 132 comprised of a head portion 134 and two leg portions 136 extending from respective ends of the head portion 134. A cross-brace 134 extends between the legs 136 of the U-shaped outer frame 132 and is generally parallel to the head portion 134. The cross-brace 134 is spaced from the head portion 134 of the U-shaped outer frame by a distance that is similar to the distance between the base 136 of the liner 114 and a lowermost (as orientated in use) portion of the access port 124.

When the U-shaped frame is inserted into the pocket 132, the legs of the U-shaped frame 132 extend from a point roughly adjacent the base of the liner 114 along respective lateral edges of the outer wall 128 and help to ensure that the front wall remains generally upright in use. The cross-brace will lie in the vicinity of the lowermost (as orientated in use) portion of the access port 123 and support the access port 124.

In one envisaged arrangement the liner may include only the aforementioned housing for a front wall reinforcing member 130. In another envisaged implementation, the liner may, as shown in FIGS. 27 to 29, include both a housing for a front wall reinforcing member and a housing for a base reinforcing member 112 of the type shown in FIGS. 24 to 26. In this latter case, the U-shaped frame 132 and the base reinforcing member 112 may be configured so that the U-shaped frame 132 can be positively engaged with the base reinforcing member 112, for example snap-fitted into the base reinforcing member 112 so that the two components are coupled together. This arrangement provides additional support for the walls of the liner.

As shown in FIG. 28, the liner may also be provided with a pocket 27 for receiving a scoop, for example a pocket of the type described above in connection with FIGS. 8 to 10 of the drawings.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims. For example, the platform and liner support need not necessarily be configured for use with a liner that includes a resiliently deformable member. It could, for example, comprise a plurality of hooks that are o-operable with eyes provided in the liner sidewall to support the liner.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6.

The invention claimed is:

1. A waste receptacle for animal excreta, the waste receptacle comprising:
   a base and at least one sidewall upstanding from the base, the base and the at least one sidewall co-operating to define a housing having an internal void, a periphery of the at least one sidewall remote from the base defining an opening to the void, a planar platform support coupled to the at least one sidewall in the vicinity of the sidewall periphery; and a planar platform including a top upon which a cat may step and litter may be left, the planar platform supportable by the planar platform support to partly obstruct the opening, the planar platform comprising first and second planar platform parts that are pivotally coupled to one another by a first hinge and a second hinge, neighboring peripheral walls of the first and second planar platform parts each comprising a recess, the recess in the peripheral wall of the first planar platform part cooperating with the recess in the peripheral wall of the second planar platform part to define an access port for enabling an animal to access the internal void of the housing via the access port, the neighboring walls of the first and second planar platform parts being spaced from one another to provide a lateral gap between the first and second planar platform parts in a closed position, wherein the lateral gap extends from one lateral edge of the planar platform through the access port to an opposite lateral edge of the planar platform in the closed position, the arrangement being such that litter on the planar platform can fall into the void through the lateral gap and the access port when one of the planar platform parts is pivoted relative to the other from the closed position to an open position, wherein pivoting one of the first planar platform part or the second planar platform part towards the other of the first planar platform part or the second planar platform part, from the closed position to an open position, causes the litter to fall towards the lateral gap, located between the first and second planar platform parts and the access port.

2. A waste receptacle according to claim 1, further comprising a liner insertable into the internal housing void, the housing liner having a liner base and at least one liner sidewall supportable in use so as to be generally upstanding from the liner base, the liner base and the at least one liner sidewall cooperating to define an internal liner void for the receipt of animal litter.

3. A waste receptacle according to claim 2, wherein
the liner base includes a housing for a liner base reinforcing member;
the liner base reinforcing member being operable, when received in the liner base reinforcing member housing, to maintain the liner base in a generally planar configuration.

4. A waste receptacle according to claim 3, wherein the base reinforcing member housing comprises a pocket, the pocket being open at least one end for the receipt of the base reinforcing member.

5. A waste receptacle according to claim 4, wherein base reinforcing member comprises a generally planar body, including a tray-like configuration.

6. A waste receptacle according to claim 2, wherein the planar platform support is operable to support at least a portion of the liner so as to assist with the maintenance of the at least one liner sidewall in a generally upright configuration when the liner is installed in the receptacle.

7. A waste receptacle according to claim 2, wherein the at least one liner sidewall is supportable in use by means of a resiliently deformable member coupled to a portion of the liner sidewall distal from the liner base.

8. A waste receptacle according to claim 7, wherein the planar platform support co-operates with the resiliently deformable member to support the liner sidewall.

9. A waste receptacle according to claim 8, wherein the planar platform support includes a groove configured to receive the resiliently deformable member.

10. A waste receptacle according to any of claim 2, wherein the at least one liner sidewall is supportable in use by means of support elements coupled to the planar platform support, the support elements being configured to cooperate with complementary elements coupled to the liner sidewall.

11. A waste receptacle according to claim 1, wherein the planar platform is detachably supportable by the planar platform support.

12. A waste receptacle according to claim 1, further comprising a platform retainer and a receiver for a platform retainer, wherein the platform retainer is coupled to one of the planar platform and the housing sidewall and the receiver for a platform retainer is coupled to the other of the planar platform and the housing side wall, the receiver being co-operable with the platform retainer to keep at least a portion of the planar platform in abutment with the planar platform support.

13. A waste receptacle according to claim 1, wherein the planar platform support comprises a plurality of platform supports.

14. A waste receptacle according to claim 13 comprising a first platform support coupled to the housing to support a first longitudinal side of the planar platform and a second platform support coupled to the housing to support a second longitudinal side of the planar platform opposite the first longitudinal side.

15. A waste receptacle according to claim 13 comprising a U-shaped first platform support coupled to the housing to support a first end of the planar platform, and a second substantially planar platform support coupled to the housing to support a second end of the planar platform.

16. A waste receptacle for animal excreta, the waste receptacle comprising:

a base and at least one sidewall upstanding from the base, the base and the at least one sidewall co-operating to define a housing having an internal void, a periphery of the at least one sidewall remote from the base defining an opening to the void;

a planar platform support coupled to the at least one sidewall in the vicinity of the sidewall periphery;

a planar platform including a top upon which litter may be left, the planar platform supportable by the planar platform support to partly obstruct the opening, the planar platform comprising first and second planar platform parts that are pivotally coupled to one another, neighboring peripheral walls of the first and second planar platform parts each comprising a recess, the recess in the peripheral wall of the first planar platform part cooperating with the recess in the peripheral wall of the second planar platform part to define an access port for enabling an animal to access the internal void of the housing via the access port, the neighboring walls of the first and second planar platform parts being spaced from one another to provide a lateral gap between the first and second planar platform parts in a closed position, wherein the lateral gap extends from one lateral edge of the planar platform through the access port to an opposite lateral edge of the planar platform in the closed platform, such that litter on the planar platform can fall into the void through the gap or the port when one planar platform part is pivoted relative to the other, wherein pivoting one of the first planar platform part or the second planar platform part towards the other of the first planar platform part or the second planar platform part, from the closed position to an open position, causes the litter to fall towards the lateral gap between the first and second planar platform parts and the access port; and a removable liner insertable into the internal housing void, the housing liner having a liner base and at least one liner sidewall supportable in use so as to be generally upstanding from the liner base, the liner base and the at least one liner sidewall cooperating to define an internal liner void for the receipt of animal litter; the liner further comprising a resiliently deformable member coupled to a portion of the liner sidewall distal from the liner base, the resiliently deformable member being configured to co-operate with the planar platform support when the liner is inserted into the internal housing void to support at least a portion of the liner so as to assist with the maintenance of the at least one liner sidewall in a generally upright configuration when the liner is installed in the receptacle.

\* \* \* \* \*